United States Patent [19]

Oglevee et al.

[11] 4,430,828
[45] Feb. 14, 1984

[54] PLANT ORIENTED CONTROL SYSTEM

[75] Inventors: James R. Oglevee; Kirk A. Oglevee, both of Connellsville, Pa.

[73] Assignee: Oglevee Computer Systems, Connellsville, Pa.

[21] Appl. No.: 472,889

[22] Filed: Mar. 8, 1983

[51] Int. Cl.³ .................... B01F 3/02; A01G 9/00
[52] U.S. Cl. .......................... 47/17; 236/44 C; 165/21
[58] Field of Search ................. 47/17; 236/44 C; 165/21

[56] References Cited

U.S. PATENT DOCUMENTS 3,905,153  9/1975  Enter ........................ 47/17 X
3,949,522  4/1976  Kehl et al.

FOREIGN PATENT DOCUMENTS 2037554  of 0000  United Kingdom ........... 47/17

OTHER PUBLICATIONS

"The Effect of Quantum Flux Density, Day and Night Temperatures and Phosphorous and Potassium Status on Anthocyanin and Chlorophyll Content in Marigold Leaves" by A. M. Armitage et al., No. 106(5): 639-642, (1981).
"The Effect of Temperature and Quantum Flux Density on the Morphology, Physiology, and Flowering of Hybrid Geraniums" by A. M. Armitage et al., No. 106(5): 643-647, (1981).
"Determination of Flowering Time and Vegetative Habit of Tagetes patula through Response Surface Techniques" by A. M. Armitage et al., No. 106(5): 632-638, (1981).
"Effect of $CO_2$ Enrichment on Greenhouse Crop Production" Paper No. 81-4524 by S. K. Upadhyaya et al., (Dec. 15-18, 1981), American Society of Agriculture Engineers.
"Direct Digital Control of Plant Growth-I. Design and Operation of the System", T. Takakura et al., Transactions of the ASEA, (vol. 17, No. 6, pp. 1150-1154, (1974)).
"A Microprocessor-Based Control System for Greenhouse Research", Paper No. 78-5547 by D. H. Willits et al., (Dec. 18-21, 1978), American Society of Agricultural Engineer.
"Energy Management Systems and the SCIRAY Greenhouse Project," Paper No. 81-1606 by H. M. Butterworth et al., American Society of Agricultural Engineers, Acta Horticulturea, No. 106, (Mar. 1980), pp. 67-75; 91-108; 117-125.

Primary Examiner—William E. Wayner
Attorney, Agent, or Firm—Webb, Burden, Robinson & Webb

[57] ABSTRACT

A system for controlling environmental conditions in greenhouses having a plurality of crop beds. The system comprises sensors stationed over crop beds comprising an aspirated enclosure and means therein for generating analog electrical signals indicative of wet bulb and dry bulb temperatures. The system comprises a microcomputer located within the greenhouse having a central processing unit with associated scratch memory and program memory sections; an analog to digital input section for receiving the analog electrical signals from the sensors; an output section for converting the computer logic signals to electrical signals at power levels to operate electromechanical apparatus; and serial digital pathway means for connecting the central processing unit, input section and output section. The system further comprises a memory programmed with a task for inputting digital data from the input section indicative of wet bulb and dry bulb temperatures and for calculating the moisture content of the atmosphere over each bed; a task for comparing the temperature and said moisture content with preselected command levels; and a task which in response to said comparison generates commands to the output section capable of initiating therethrough electromechanical action to move the temperature and moisture content toward the preselected command levels.

7 Claims, 28 Drawing Figures

PLANT ORIENTED CONTROL SYSTEM

DESCRIPTION

1. Field of the Invention

This invention pertains to a plant oriented system for controlling environmental conditions in greenhouses.

2. Background

Automatic control of temperature in a greenhouse by regulating heating and ventilation is old in the art. In fact, other factors affecting the growth and health of the crops being grown in the greenhouse have been automatically controlled. However, in the past control has been directed to maintaining the overall greenhouse environment based upon a small number of sensors and traditional control devices such as single thermostats. Microprocessor control of greenhouse environment has been much discussed in various papers. However, attempts to use computers to control the greenhouse environment, to applicants' knowledge, have not been totally successful. One problem has been the inherently noisy (electronically speaking) environment of the greenhouse causing distortion of small magnitude signals. Another has been the necessity to keep the computers outside of the greenhouse itself. Thus prior greenhouse control systems have not been plant or crop oriented control systems. They have not addressed the problems of controlling growth and plant health conditions directly at the growing bed or plant level. Unfortunately, the control of the overall greenhouse conditions, while providing adequate plant growth and health conditions at one bed, may not provide the proper conditions at another bed. This may be due to the nonuniformity of a condition, say temperature, throughout the greenhouse or the fact that different beds are planted with different crops or even that different beds planted with the same crop are at different stages in the growing cycle. Prior greenhouse control systems have not provided adequate individualized control of bed areas based upon feedback of temperature, light, and humidity conditions directly over the beds.

SUMMARY OF THE INVENTION

It is an object of this invention to provide a computerized plant oriented control system for control of the greenhouse environment including, for example, temperature, light, moisture, and/or carbon dioxide concentration.

It is a further object to provide a computerized plant oriented control system for minimizing the amount of electrical or fuel energy required by the greenhouse and to maintain the temperature over the crop beds relative to a control point, say, maximum temperature, minimum temperature, and/or dew point.

It is a still further object to provide a computerized plant oriented control system which anticipates changes in the conditions over the crop beds by sensing remote conditions such as light above shades, external temperatures, wind velocity and direction.

It is yet another object of this invention to provide a plant oriented control system for programming growth rates by maintaining one or more conditions such as temperature, mist, irrigation, and carbon dioxide concentration in the atmosphere over the beds as a function of the available light and/or a controlled amount of light incident the crop bed.

It is an object of one embodiment of this invention to provide a computerized plant oriented control system that as a function of light, temperature, and humidity over the beds and the age of the crops provides the amount of mist or irrigation necessary to insure healthful propagation and growth of the crop.

It is a feature according to this invention that a greenhouse has a plurality of sensing zones and a plurality of control zones which are not contiguous and wherein each sensing zone is provided individualized environmental control based upon its particular needs. According to an especially sophisticated embodiment of this invention where control conditions are changed from time to time, the control algorithms in the microcomputer within the greenhouse may be changed by downloading from a host computer located external to the greenhouse and, for example, serving more than one greenhouse.

It is a still further advantage according to this invention to provide a plant oriented crop control system that is extremely versatile in its accommodation to the type of heating and cooling and other environmental control systems already in place in a majority of existing greenhouses notwithstanding the diversity of the existing systems.

The plant oriented control system makes proper decisions based upon the needs of the plants or crops and will give the grower a more energy efficient method of control over the greenhouse environment. The system includes components that collect data such as temperature, light, humidity, wind speed and direction. A central microcomputer unit uses the data obtained to make decisions and act upon them. The microcomputer is programmed with one or more algorithms to make the decisions. The algorithms may be modified depending upon the nature of the crop and the greenhouse system being controlled. The plant oriented control system provides a fully automated greenhouse environment with the ability to monitor and control all applicable conditions.

In it broadest expression, the computerized plant oriented control system comprises structure defining a plurality of sensing zones, structure defining a plurality of control zones and a microcomputer within the greenhouse programmed with algorithms or tasks for maintaining at least one environmental condition in the control zones to promote the health and growth of the crop or crops. For those embodiments which relate to anticipatory control condition, sensors remote from the bed such as external temperature, wind speed and wind direction sensors are required. For those embodiments involving programmed plant growth wherein conditions above the crop bed are controlled as a function of the crop age, the microcomputer must include a real time clock.

As the terms are used herein, a "sense zone" or "sensing zone" is a bed area, preferably not in excess of about 3,000 square feet all planted with the same crop at about the same time having at least two spaced temperature sensors positioned directly over and near (within about three feet) of the bed, a light sensor directly over and near the bed and an aspirated humidity sensor directly over and near the bed. As used herein, various "control zones" may include a heating control zone, cooling control zone, misting control zone, irrigating control zone, shade control zone, heat retention control zone, horizontal flow control zone, and carbon dioxide atmosphere control zone. Each control zone has associated with it a controllable device for affecting the environment within the zone. A heating control zone comprises a bed area, including at least one sensing zone, that has a controllable heating element associated therewith. A cooling control zone comprises a bed area, including at least one sensing zone, that has a controllable cooling system associated therewith. This may simply be a cross-ventilation pathway controlled by one or more vents. A misting control zone comprises a bed area, usually one sensing zone, having controllable water spray over the bed. An irrigating control zone comprises a bed area, usually one sensing zone, having a controllable bed watering system. A shade control zone comprises a bed area, including at least one sensing zone having a controllable sunscreen or shade associated therewith. The shade control zone might become a heat retention zone at night as radiative cooling can be controlled by the presence or not of the screen or shade over the bed. A horizontal flow control zone is a bed area, including at least one sensing zone, that has a controllable horizontal circulation fan associated therewith to prevent stratification when no ventilation is being used. A carbon dioxide atmosphere control zone comprises a bed area, generally the entire enclosed greenhouse, having means for generating carbon dioxide. It should be noted that the various control zones need not be contiguous but very often are overlapping. (For example, a large greenhouse may have two cooling zones but many heating zones.) Controllable devices associated with the control zones are devices which may be activated, for example, by application of an AC current such as a solenoid control valve or an AC motor controlled by a motor controller which controller provides the function of starting, stopping, and reversing a motor.

As stated above, the microcomputer must be programmed with algorithms or tasks to enable it to make intelligent decisions. An algorithm or task, at spaced intervals, inputs the digitalized temperatures (two for each bed) and averages the temperatures for each bed or sense zone. The average temperature is then compared to a set point, for example a maximum temperature, a minimum temperature or the dew point. Depending upon the relationship of the average temperature sensed and the set point, the computer will output control signals to adjust the controllable devices such as heating or ventilating equipment to adjust the temperature relative to the set point temperature.

Additionally, an algorithm may maintain the temperature and perhaps mist, irrigation, or carbon dioxide atmosphere as a function of the available light to provide a desired growth rate and/or to make efficient use of energy.

On a cloudy day, heat and carbon dioxide would not be wasted. A second control criteria could be imposed with such an algorithm; namely, to control the growth rate to be the maximum possible or to control the growth rate to be that which is estimated to bring the crop to the desired size at a desired date. The latter criteria, of course, require a clock to log time from planting and may require a controllable shade. An algorithm or task according to one embodiment of this invention maintains the temperature by advance adjustments of controllable elements based upon changes in the remote sensors as well as upon the data from overhead sensors. According to another specific embodiment, an algorithm or task initiates mist or irrigation as a function of light, temperature, humidity and age of the crop.

THE DRAWINGS

Further features and other objects and advantages of this invention will become clear from the following detailed description made with reference to the drawings in which FIG. 1 is a schematic illustrating a greenhouse, sensing zones and control zones according to this invention;

Figure 20A:
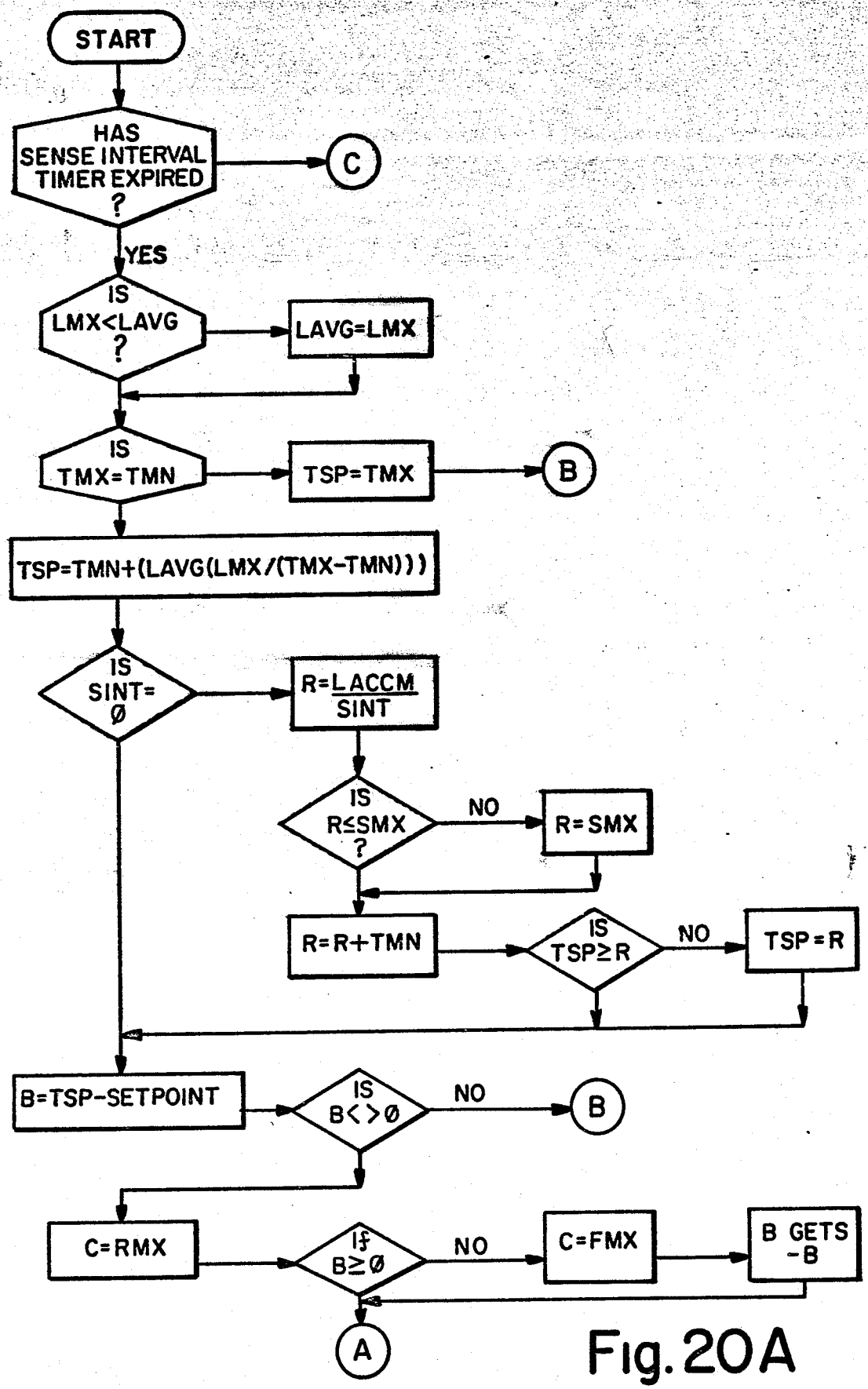
Figure 20B:
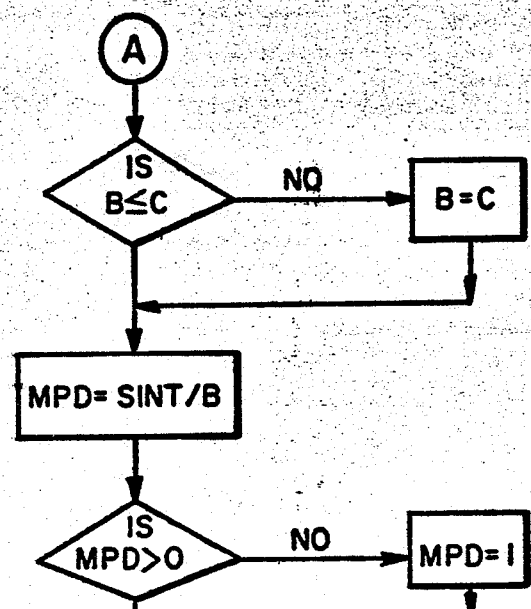
Figure 20C:
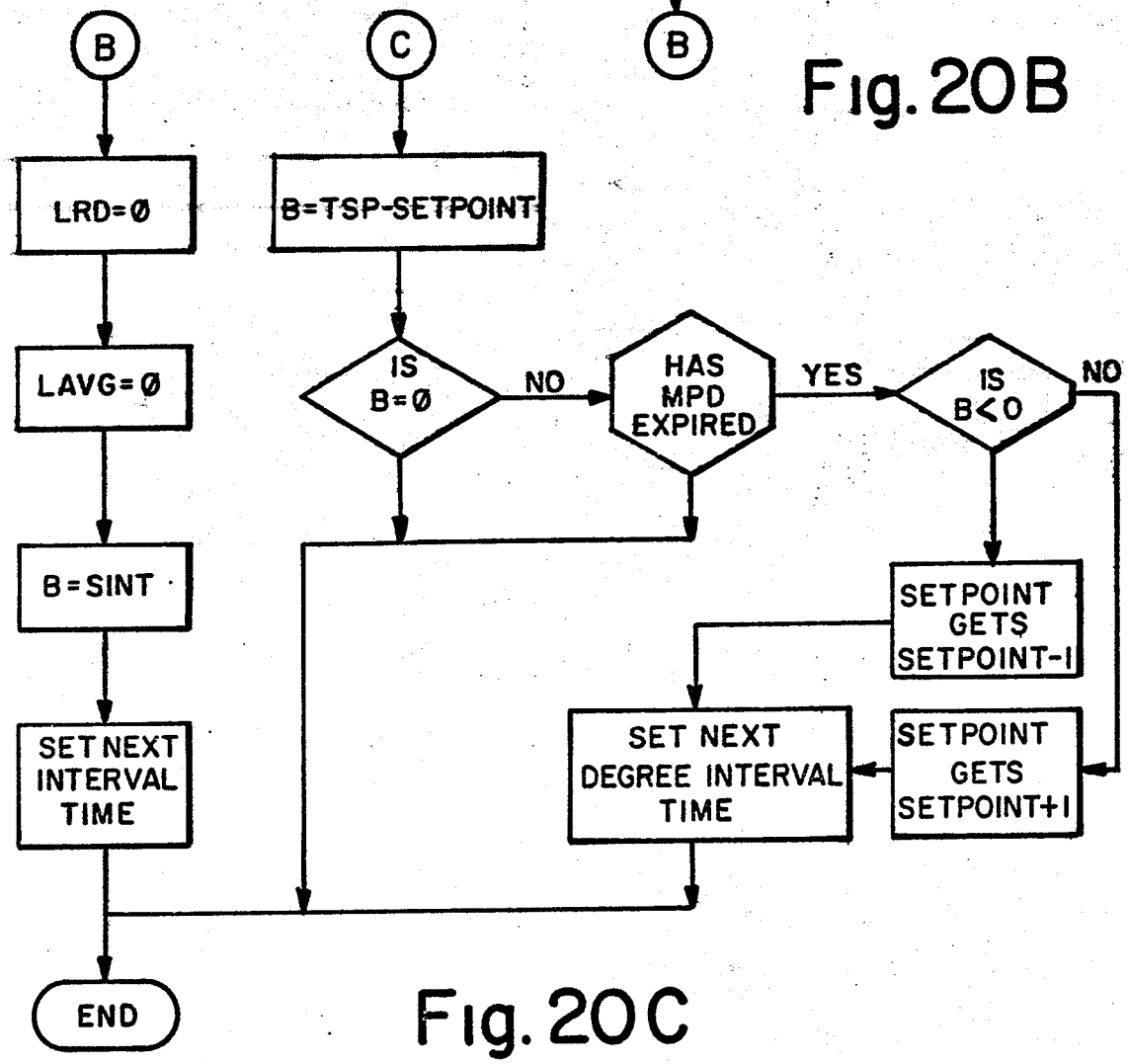
Figure 21:
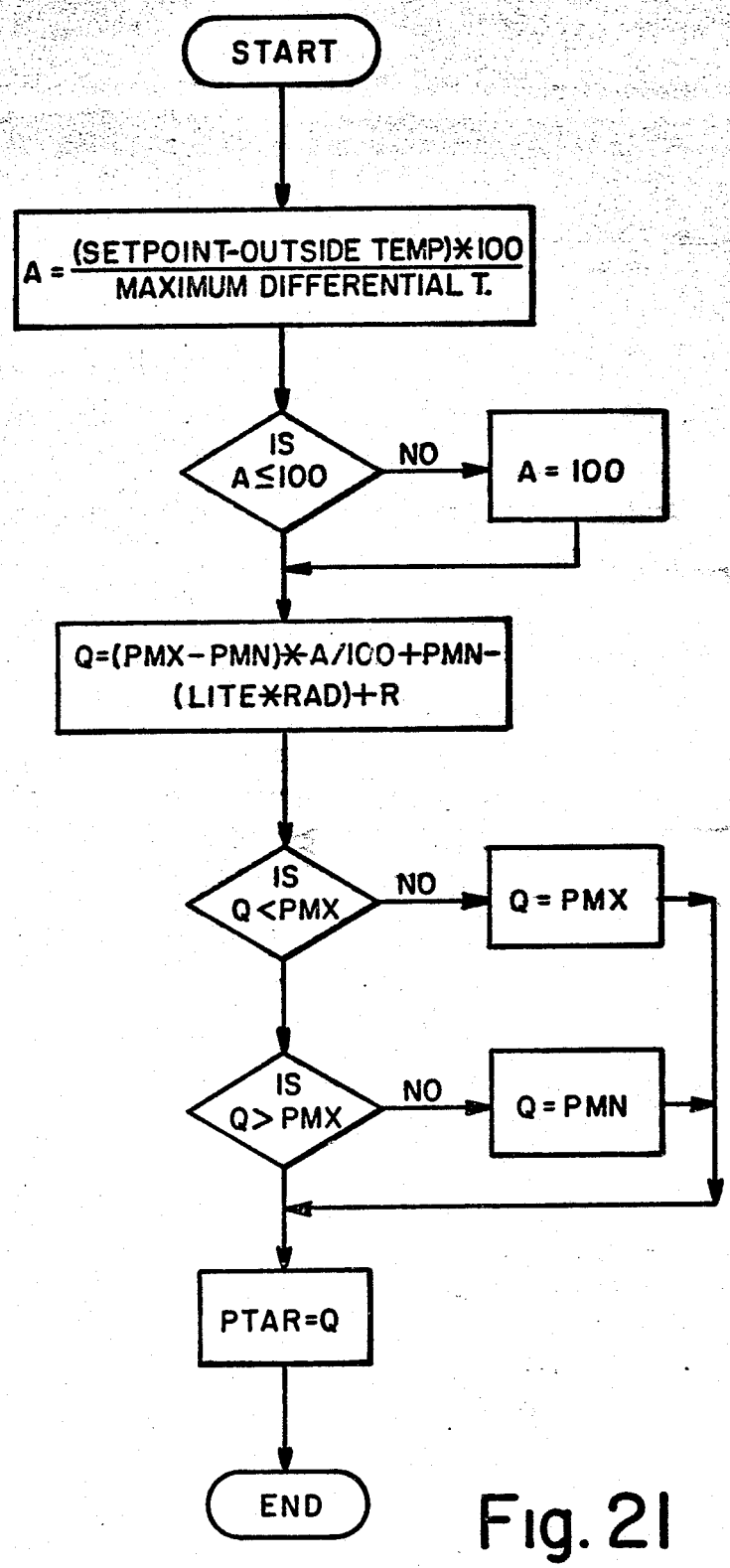

FIGS. 20A, 20B, and 20C are flow diagrams of a HEAT SET POINT DRIVER based upon average light and accumulated light;

FIG. 21 is a flow diagram for a PIPE TEMPERATURE ANTICIPATOR procedure; and

Figure 22A:
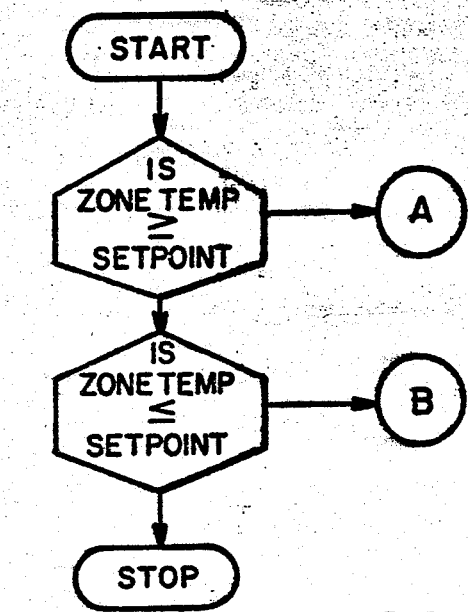
Figure 22B:
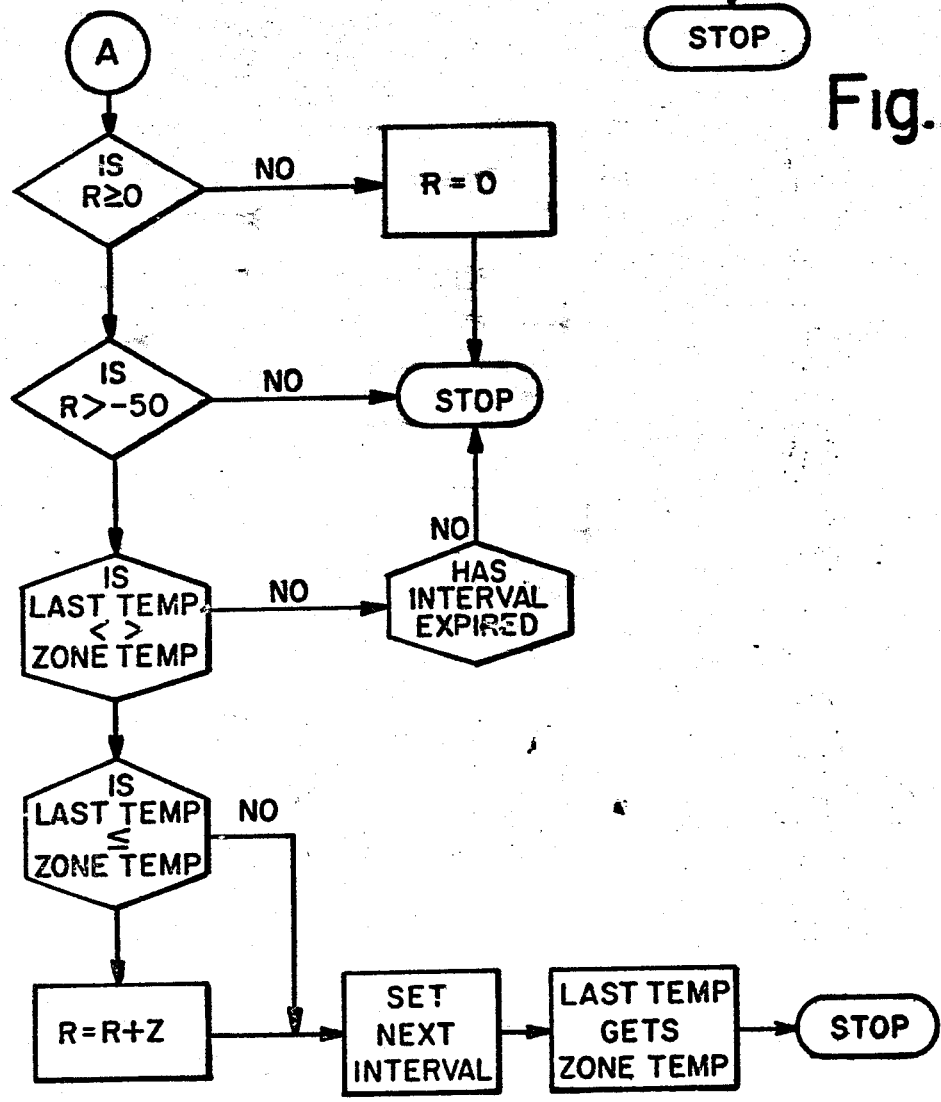
Figure 22C:
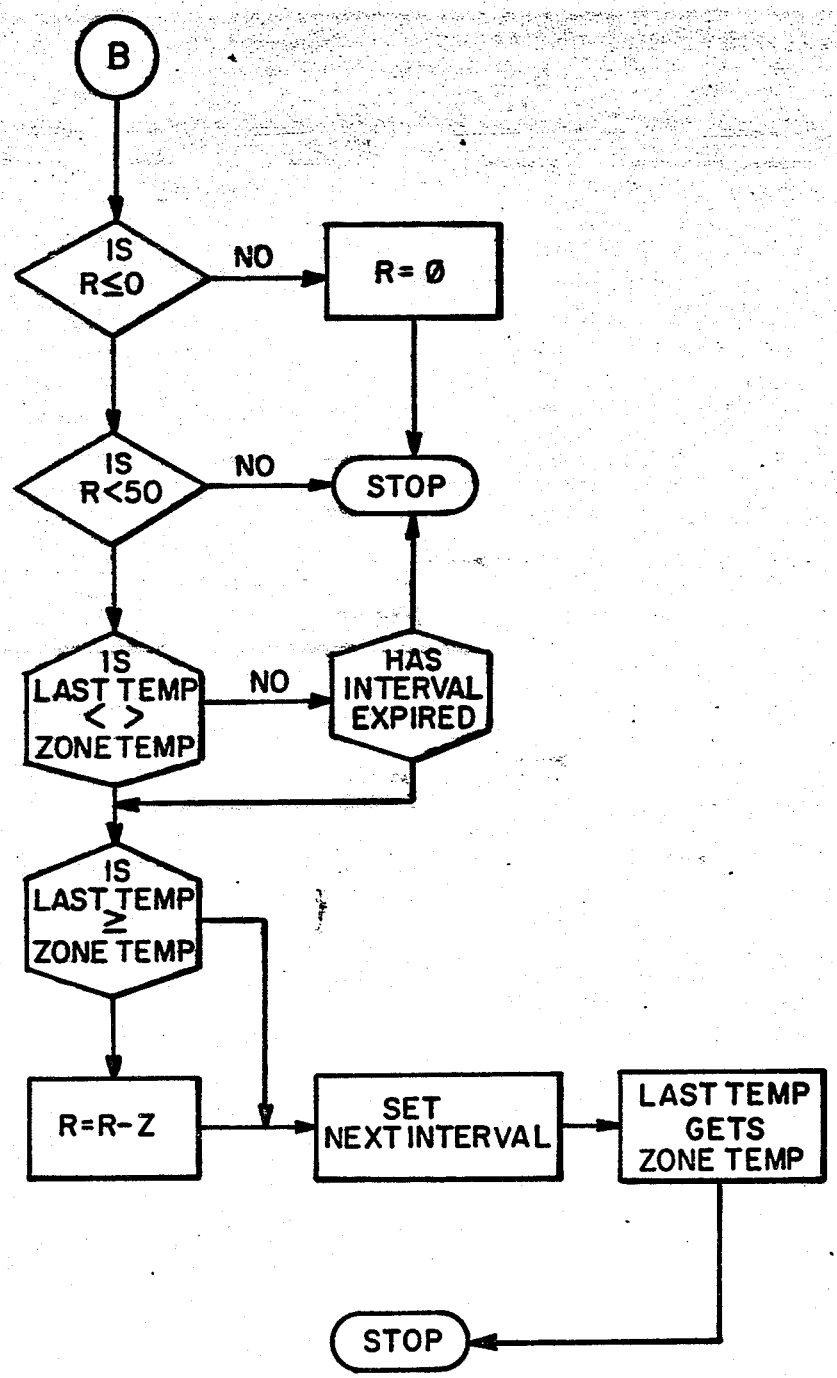

FIGS. 22A, 22B, and 22C are flow diagrams of a procedure that generates a factor for the PIPE TEMPERATURE ANTICIPATOR procedure based upon variation between zone temperature (as measured) and set point temperature (desired).

DETAILED DESCRIPTION

The equipment for the plant oriented control system according to this invention can be considered in three groups based upon their functions. First there are the sensors. These collect greenhouse data such as temperature, humidity, light, and such external conditions as temperature, light, humidity, wind speed and direction. A second group comprises the microcomputer with associated input and output boards. A third group comprises the valves and motors necesssary to carry out the actions that bring about a change in the greenhouse environment.

The grower must determine the number of "control zones" he intends to include in his greenhouse. A zone is defined as one part of the total greenhouse of which individual, independent control can be maintained. The type and location of existing equipment within a greenhouse determine the establishment of control zones. Sensing zones and control zones have already been described. Heating and cooling zones need not be related so it is not necessary that they each have the same division. For example, as a practical matter, an acre of greenhouse may have sixteen heating zones but only two cooling zones.

The crops in the adjacent sense zones within the same control zone theoretically might require a controlled condition to be different. However, due to the nature of crop requirements and the usual greenhouse control configurations, this is seldom the case. With some planning of crop placement, the problem can be avoided. For example, most sense zones are coincident with a control zone for heating (for example, hot pipes); misting or irrigating. These are conditions that may vary from crop to crop. On the other hand, ventilation zones usually span a number of sense zones. The ventilation requirement is generally about the same for all crops.

Figure 1:
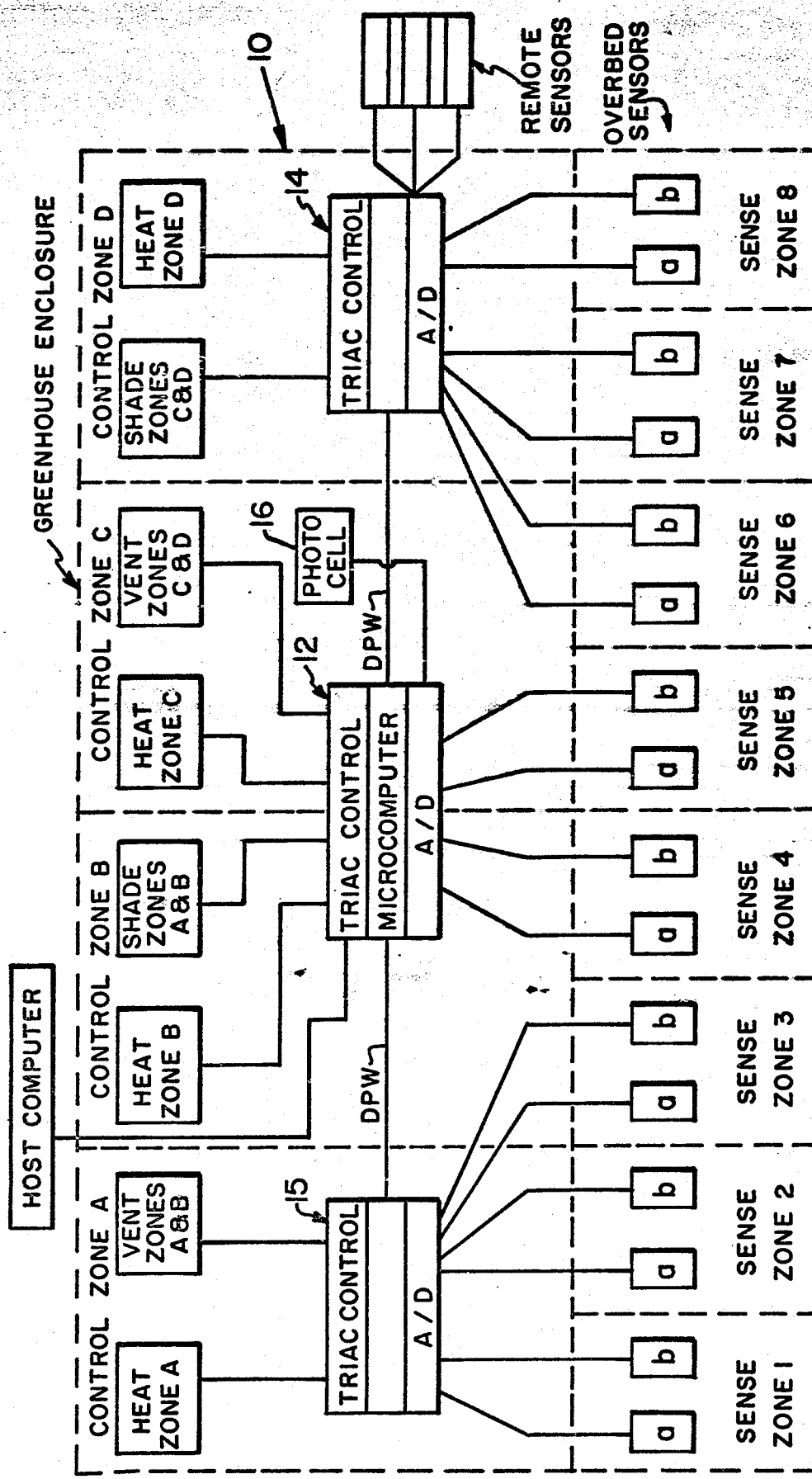

Referring now to FIG. 1, the system hardware according to this invention is shown schematically. The large rectangle represents the greenhouse enclosure 10. Located within the greenhouse is a microcomputer 12 having associated A/D input sections and AC output (triac control) sections. Two IO stations 14 and 15 are spaced from the microcomputer. The IO stations have associated A/D input sections and AC output sections, identical with those directly associated with the microcomputer and, as will be explained, they are functionally equivalent to those directly associated with the microcomputer. All A/D input sections and AC output sections are connected to the microcomputer by one common asynchronous serial address-data-control pathway referred to in here as the data pathway (DPW). It is possible that IO stations will be unnecessary in a small greenhouse. In fact, for the number of sense zones illustrated in FIG. 1, the A/D input systems and AC output sections directly housed within the microcomputer would be sufficient. The use of IO stations depends upon the number of sense zones being monitored and the spacing thereof. It is desirable to reduce the length of the sense input wires carrying analog signals and thus the additional IO stations may be required.

The greenhouse of FIG. 1 is divided into eight sensing zones, each having two sense stations a, b, over the bed. Sense stations are aspirated enclosures for housing at least a dry bulb temperature sensor and often both dry bulb and wet bulb temperature sensors and for generating an analog signal indicative of these temperatures. A light sensing station for generating an analog signal indicative of light intensity over the bed is often associated with the temperature sensing station. A second temperature sensing station is always associated with each sense zone. The two temperatures are averaged by the microcomputer to obtain a temperature representative of the sense zone temperature.

Referring again to FIG. 1, the greenhouse is further divided into a number of control zones. For example, four zones labelled A, B, C, and D have individually controlled heating means. The heating means may comprise a number of possible devices, for example, on-off steam heating below the beds, proportional hot-water heating below the beds, infrared heaters above the beds, or gas fired unit heaters above the beds.

To illustrate that the control zones may overlap, two ventilation control zones are illustrated; one extending to heating control zones A and B and the other to heating control zones C and D. Ventilation may be by opening vents on each side of the greenhouse or by turning on fans that draw air across the ventilation zone. The intake vents may or may not have evaporation coolers associated therewith depending upon the application. Shade zones comprising canvas shades that are drawn horizontally over the beds just below the rafters may be arranged in zones. In the example of FIG. 1, there are two shade zones comprising control zones A and B and control zones C and D. The shades are useful for two purposes: In the daytime, the drawn shades reduce sunlight and temperature of the beds. At night the shades help to maintain temperature over the beds by reducing radiation cooling. Located above the shade is a light sensor 16 enabling the detection of the availability of sunlight when the shade is drawn.

To this point, all of the elements of the system being described are positioned within the greenhouse enclosure. Two groups of optional elements may be positioned external to the greenhouse. An external temperature sensor, wind speed sensor, and wind direction sensor may be provided for anticipatory control as will be explained herein. Also a host computer for downloading new control algorithms or tasks to the microcomputer may be positioned external to the greenhouse.

Plant operated control systems must gain an adequate amount of information from each zone to be able to make the proper decisions for the correct levels of control. Each zone contains at least two temperature sensors, one light sensor, and one humidity sensor. The overbed sensors are housed in aspirated fan boxes. A light sensor must, of course, be mounted on top of the aspirated fan box. The temperature sensors comprise solid-state dry bulb temperature monitoring devices having a range $-10°$ C. to $100°$ C. The humidity sensor is a solid-state wet bulb temperature monitoring device. When used in conjunction with the dry bulb described above this provides a very precise humidity measurement. The light energy sensor measures light intensity in foot candles. Two types of sensors are used. The first provides very precise measurement of light in the range of 0 to 800 foot candles for use with artificial day length control. The second is a general daylight sensor that provides less resolution in a much wider photosynthetic range of 0 to 4,000 foot candles; that is, the range at which actual plant growth occurs. Typically the temperature sensors comprise a heat sensitive diode, say, LM335 with associated calibration potentiometers. They are commercially available calibrated for a 2.73 volt output in ice water and a 10 millivolt per degree Kelvin output.

To provide more efficient control, conditions outside of the greenhouse are also monitored. This enables the plant oriented control system to anticipate the greenhouse needs prior to any internal changes and also aids in conserving energy. A ten-mile per hour wind speed increase increases the heating load approximately fifteen percent.

The microcomputer comprises a microprocessor, RAM memory, ROM memory, a 16-place keypad input and an 8-digit display, for example. The computer is enclosed within an air-tight cabinet; preferably protected from both direct sunlight and other temperature extremes. Computers are available at rated operating temperatures between 0° and 70° C. (32° and 158° F.). Operational greenhouses have an internal temperature well within this range.

The sense sections of the microcomputer, whether in the same cabinet or in an IO cabinet spaced therefrom, collects analog data from the above mentioned sensory elements and converts it to a digital signal with an analog to digital signal converter.

Figure 2:
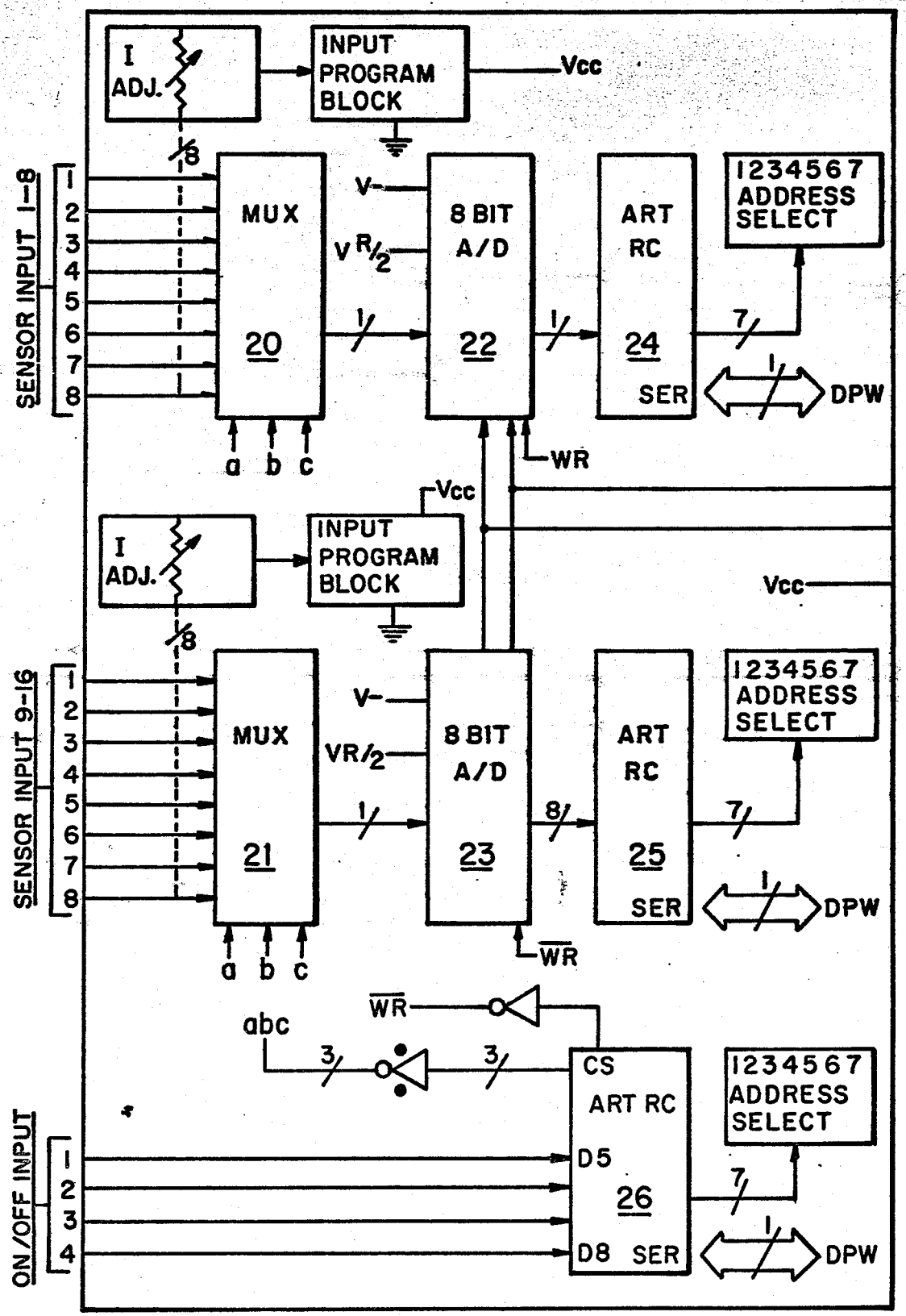
FIG. 2 is a function diagram of an input card for use with a microcomputer used in the practice of this invention.

FIG. 2 illustrates an input card that coordinates sixteen individual sensory inputs for transmission to the computer. It is possible to connect a number of these sections to the computer permitting access to a large number of individual sensory inputs. There are shown two 8-channel analog input sections comprising multiplexers 20, 21 for selecting one of eight input signals, analog to digital converters 22, 23 and asynchronous receiver-transmitter remote controllers (ART/RC) 24, 25 for transmitting the serialized digital signal to the microcomputer. The input section also includes a 4-channel on-off input useful for reading limit switches which comprises an asynchronous receiver-transmitter remote controller 26. This unit is also used to select the analog section and the channel within the analog section for application to the A/D converters through the multiplexers. These input sections may be associated in the cabinet with the microcomputer or on a remotely located cabinet.

The microcomputer also comprises an AC output section which outputs control signals to controlled devices as directed by the computer. A number of these output sections may be connected to the computer permitting control of a large number of devices. These output sections may be associated in the cabinet with the microcomputer or in a remotely located IO cabinet. In a typical application, the output section provides a direct method of control of any electrical device present in the greenhouse through use of 24 volt relays.

Figure 3:
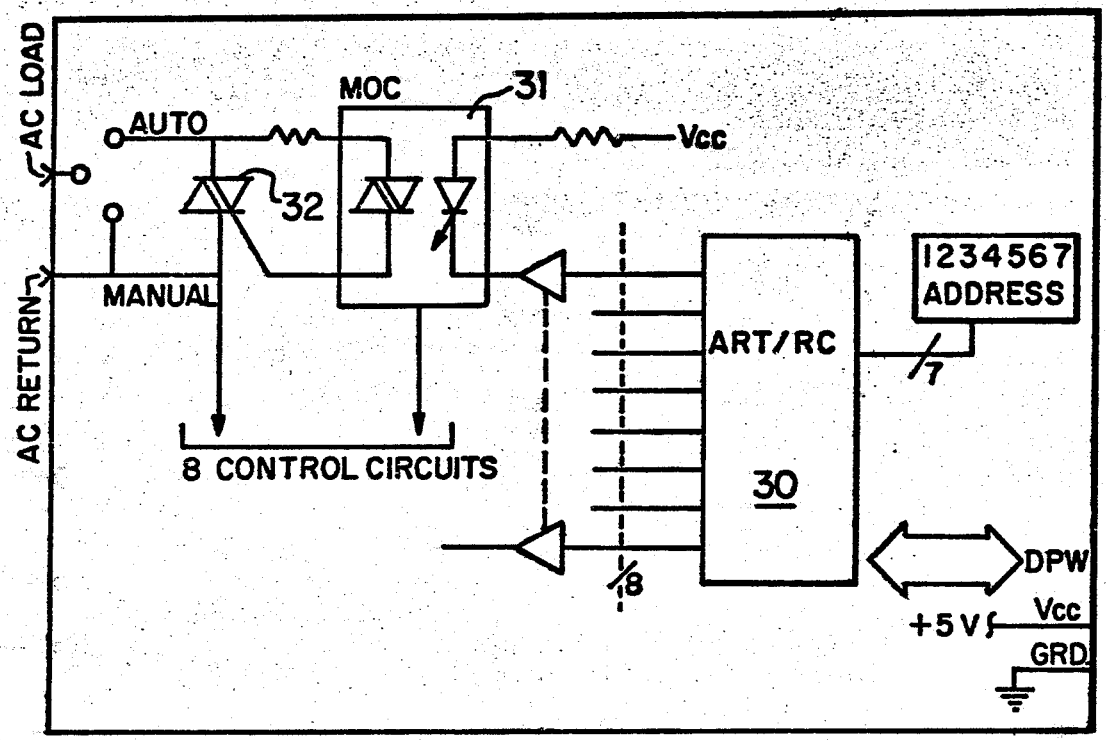
FIG. 3 is a function diagram of an output card for use with a microcomputer according to this invention.

Referring to FIG. 3, there is shown a function diagram of an output section which includes an asynchronous receiver-transmitter remote controller 30 for receiving serialized digital commands from the microprocessor and for outputting a signal on one of eight channels for controlling an optically coupled triac 31 which in turn control higher duty triacs 32.

The communication between the microcomputer and the input and output sections is by master and slave configuration of two ART/RC units. The master ART/RC 40 (see FIG. 4) is associated with the microprocessor. The slave ART/RC units (24, 25, 26, 30) are associated with the input and output sections. ART/RC devices are available, for example, from the National MM54250. The simplest communication route between the master ART/RC and its slave is by means of a twisted pair of wires or a coaxial cable. The single line IO circuit of all ART/RC devices is an open drain driver output. Because the line is floating, the master ART/RC has the IO communication line pulled up via one K ohm resistor. The pull up provides excellent data transmission over a distance of about 2,000 feet using standard coaxial cable. Car should be taken to reduce capacitance and resistance of this line and maintain good ground continuity between the master and slave units.

Pulse width modulation techniques are used by the ART/RC to transmit the digitalized data. A practical pulse frequency is approximately 450 K hertz. In practice, the frequency between each ART/RC can vary as much as 50% before performance is affected. This wide tolerance provides excellent noise immunity, especially in heavy industrial environments.

Figure 5:
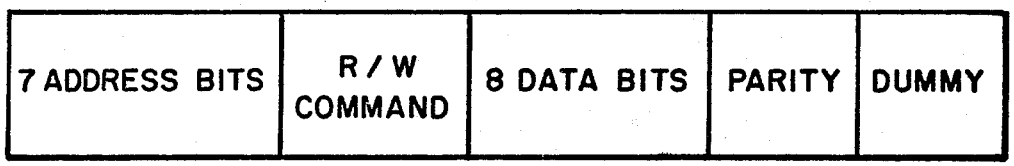
FIG. 5 illustrates the serially transmitted data format useful with this invention.

FIG. 5 illustrates the serially transmitted data format used by the ART/RC devices. Data in this format put upon the common pathway is read or written by or from the ART/RC device connected to the pathway having the 7-bit address first placed upon the line.

Figure 4:
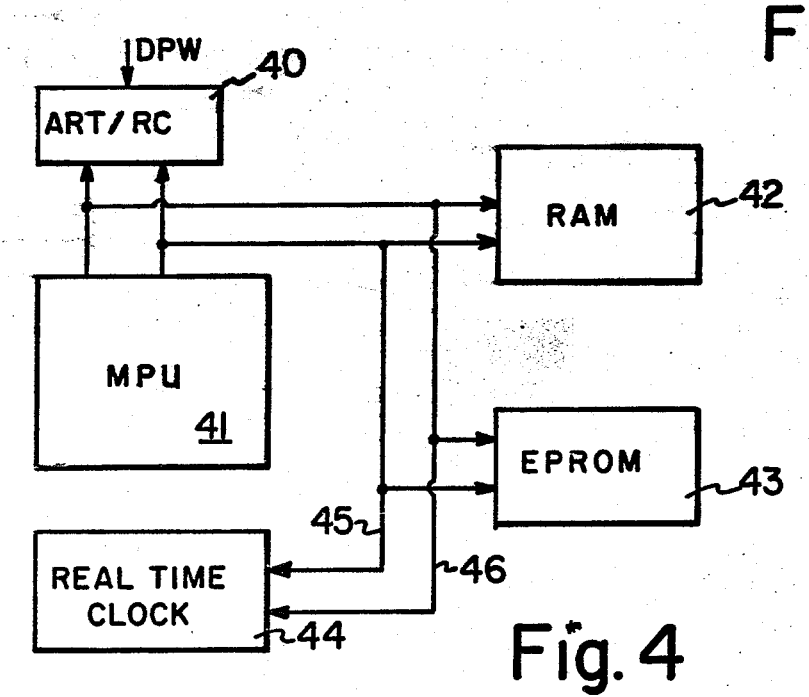
FIG. 4 is a function diagram of a microcomputer useful for the practice of this invention.

Referring more specifically to FIG. 4, a microcomputer useful according to this invention diagram is shown in function format. The microprocessor unit 41 is central operative element and may have a resident basic interpreter, for example, the INS 8073. The computer has associated RAM memory 42 and EPROM memory 43 and in some embodiments of this invention a real time clock 44. All elements are connected by address bus 45 and data bus 46 and control lines not illustrated.

Hardware particularly suitable for use in the practice of this invention comprises the computer system described in the "Vanderbilt Series K-8073 Tiny Basic Microcomputer Hardware/Software Users Manual" copyrighted in 1981 by Transwave Corporation of Vanderbilt, Pa. and a publication entitled "Vanderbilt 8000 Series Computer Products" copyrighted in 1982 by Transwave Corporation. The latter publication describes a twenty-channel analog to digital input card and an eight channel triac 300 watt controller card. Certain features of this system make it particularly suitable for greenhouse control. All or part of the control system can be placed within the greenhouse and analog transmission of data can be minimized.

Figure 6:
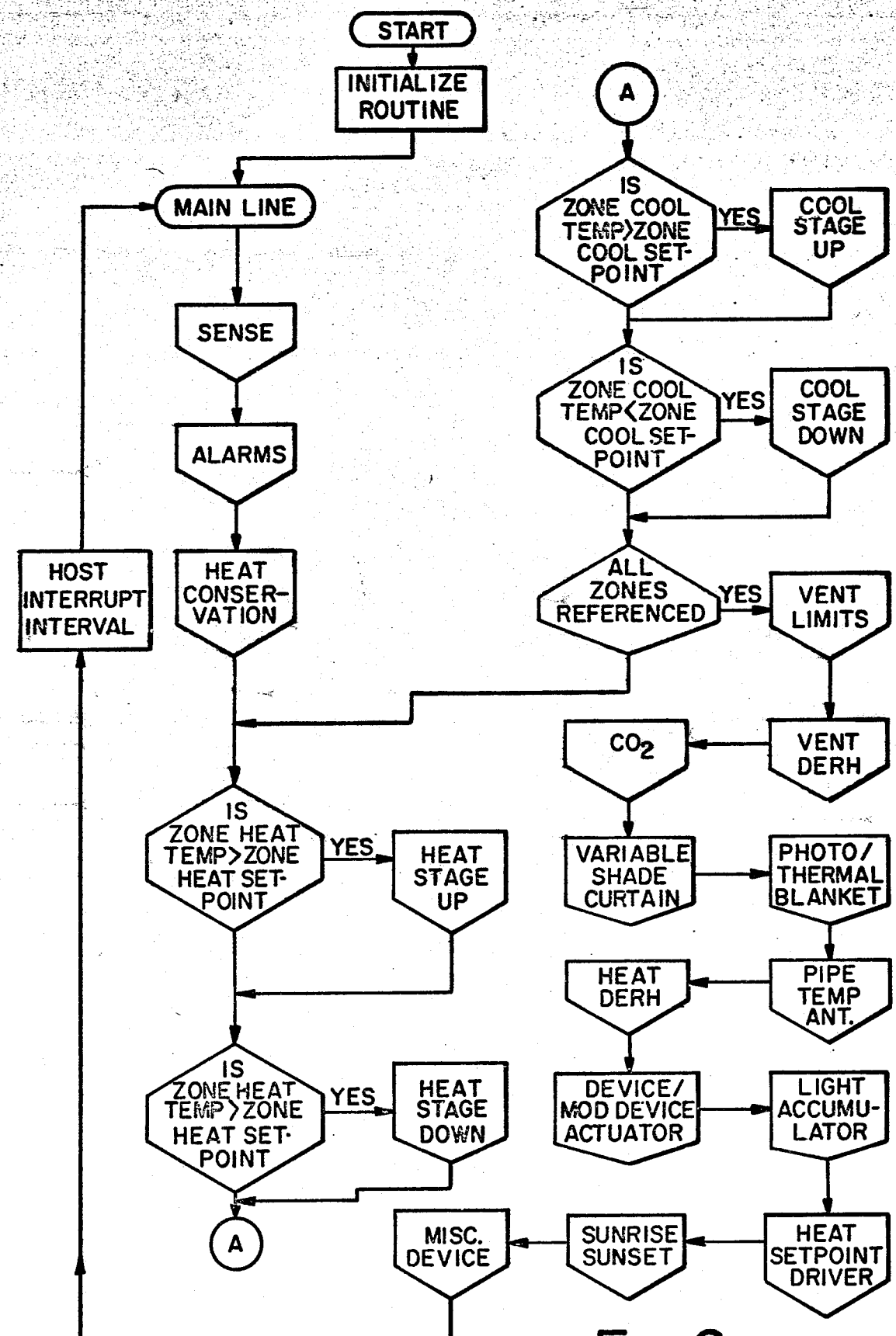
FIG. 6 is a flow chart for a main program useful according to this invention.

Referring now to FIG. 6, a flow chart for the main program is set forth. The program passes sequentially from an initialization routine through a data gathering procedure and through a temperature adjusting procedure that are repeated for each control zone and thence through a plurality of procedures that are not necessarily zone specific.

After the initialization (programming of ports and clearing of memory areas, etc.) which only takes place upon start-up or reset, the program moves to the main line loop.

Figure 7:
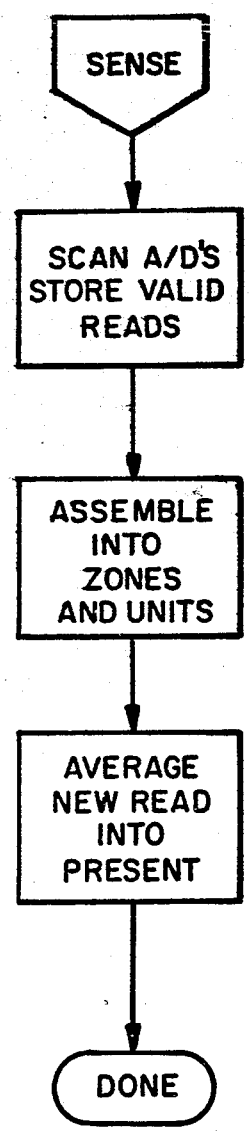
FIG. 7 is a flow chart of a SENSE procedure called by the main program.

Referring to FIG. 7, the first procedure in the main line loop is labelled SENSE and comprises scanning the data available at the A/D converters and storing valid reads. The data is then assembled by zone and scaled to provide appropriate units. The new reads are averaged into the existing reads or data.

Figure 8:
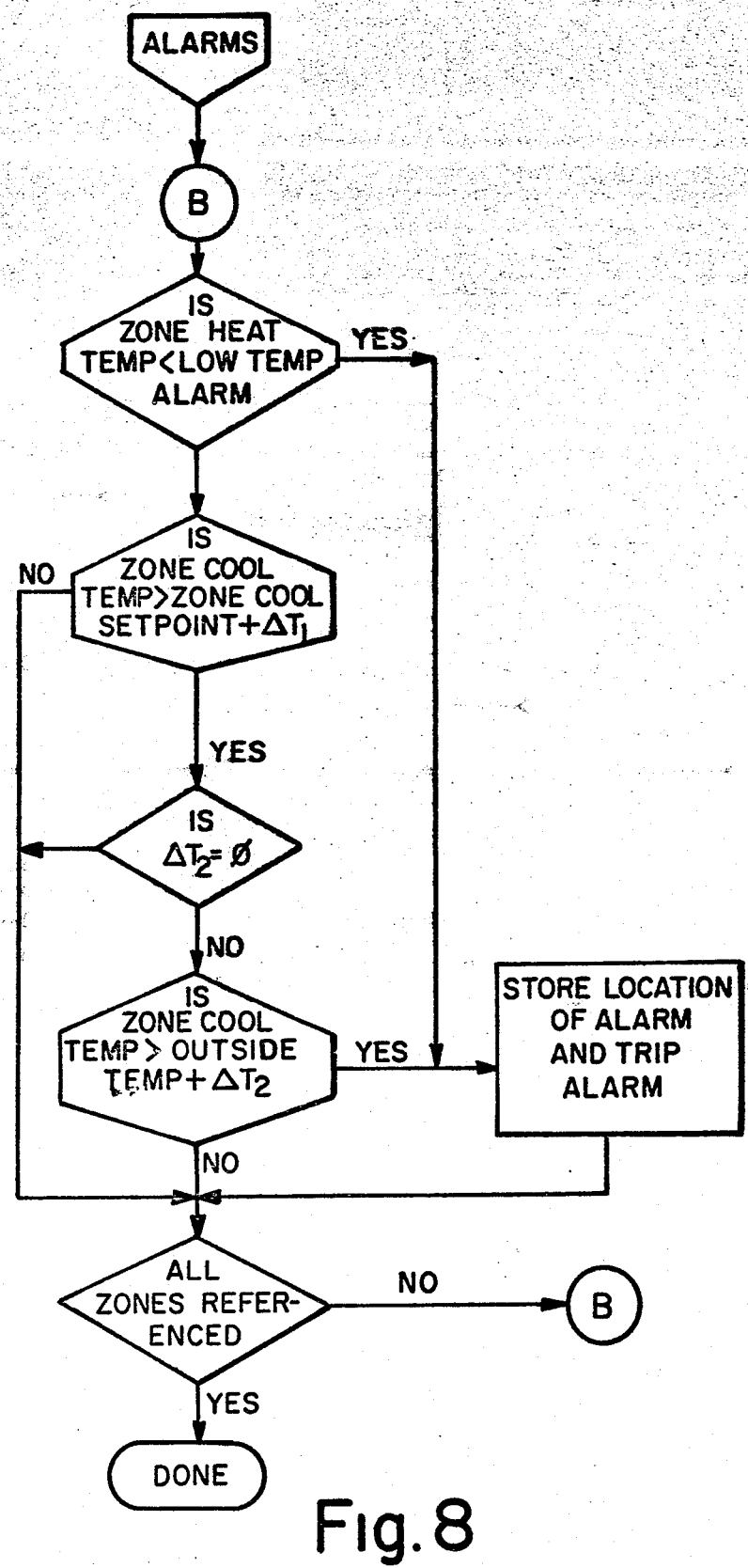
FIG. 8 is a flow chart of an ALARMS procedure called by the main program.

Referring to FIG. 8, the next procedure is labelled ALARMS and is a procedure in which temperature data is compared with high and low alarm temperatures and under the conditions that a sensing station is above the high set point or below the low alarm temperatures, the sensing station is noted and an alarm device is activated. The alarm temperature for the high temperatures is affixed differential $DT_1$ above the high temperature set point. To avoid setting off an alarm for a condition that cannot be corrected (e.g. overheating on an extremely hot day the alarm is not activated if the temperature outside exceeds the alarm temperature).

Figures 9, 10:
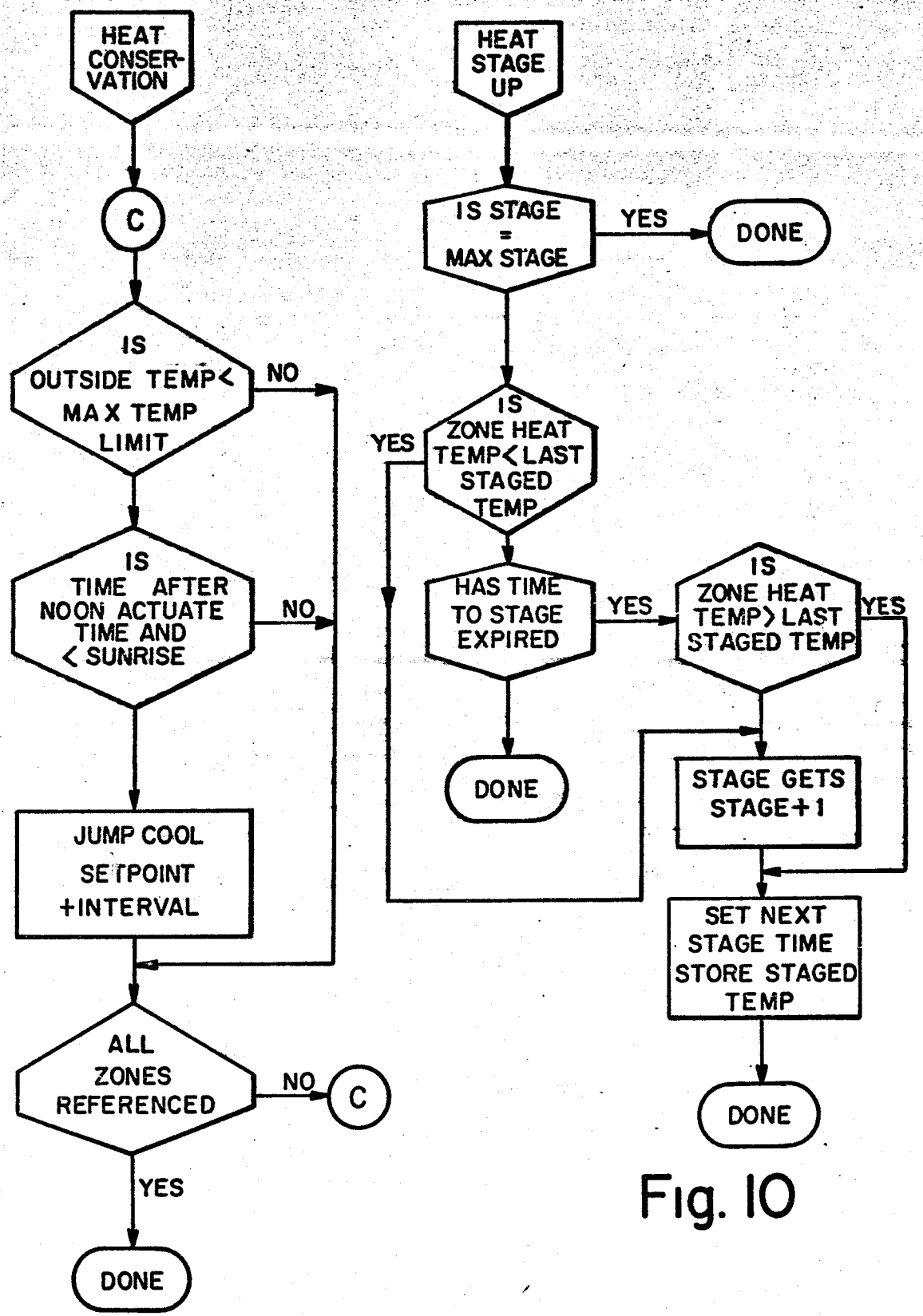
FIG. 9 is a flow chart of a HEAT CONSERVATION procedure called by the main program.
FIG. 10 is a flow chart of a HEAT STAGE UP procedure called by the main program.

Referring to FIG. 9, the next procedure labelled HEAT CONSERVATION is an optional energy conservation routine used late in the afternoon during the cool part of the year and which procedure increases the cooling set point to allow heat to build-up in the greenhouse during the late afternoon. This increase in the set points takes place only the first time through the procedure after a preselected time before sunset when heat build-up is to be allowed.

Figure 11:
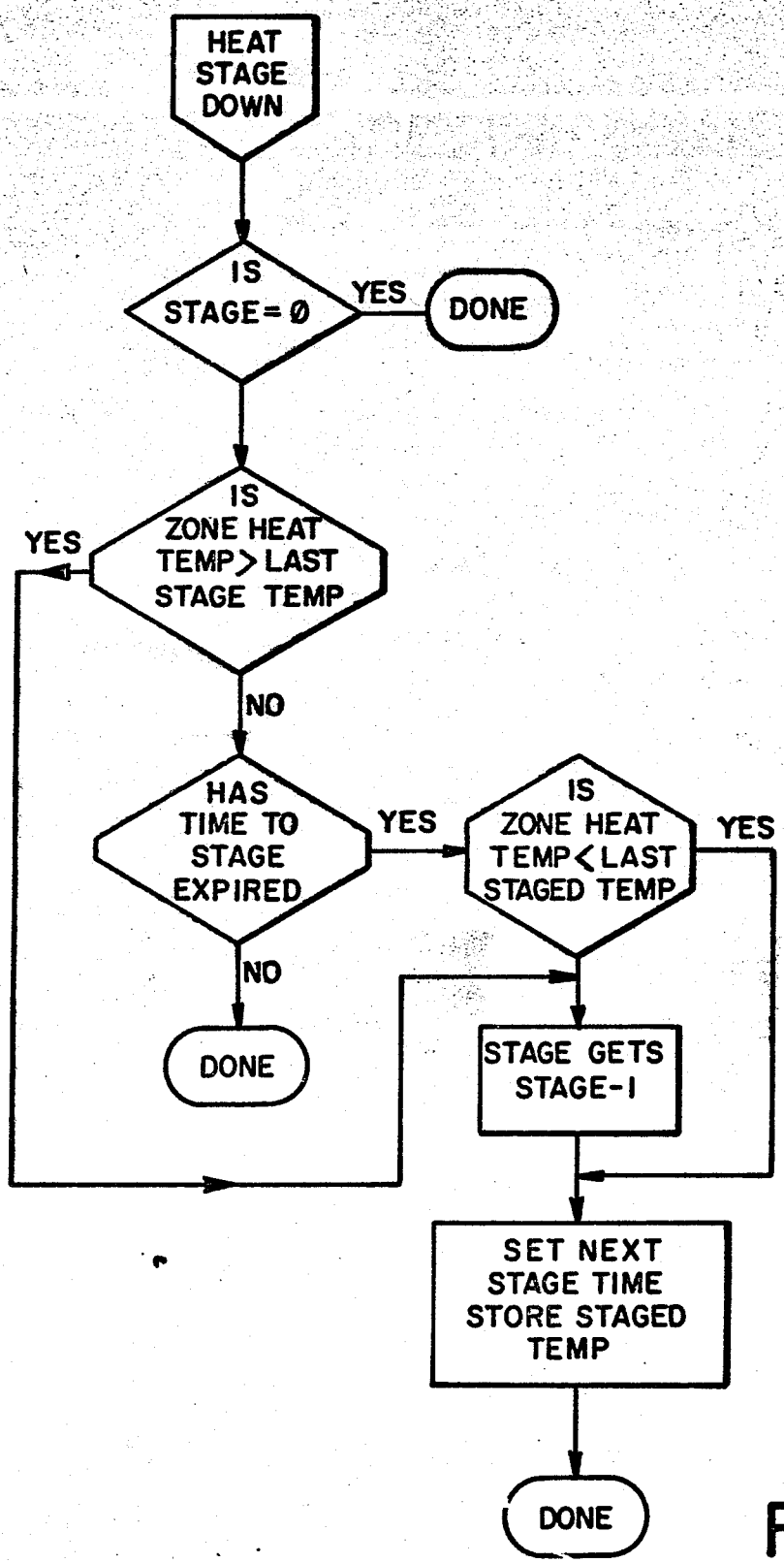
FIG. 11 is a flow chart of a HEAT STAGE DOWN procedure called by the main program.

Referring to FIGS. 10 and 11, the program next moves to heating and cooling procedures. The heating procedures HEAT STAGE UP and HEAT STAGE DOWN are implemented when the temperature external to the greenhouse falls below the desired temperatures and the cooling procedures are implemented when the temperatures external to the greenhouse exceed the desired temperature. The HEAT STAGE UP procedure is entered if the temperature in a heating zone is less than the heat set point. The procedure compares the most recent temperature reading with the last temperature reading to determine if the zone is rapidly cooling. If so, the output for increasing the stages delivering heat to the bed is incremented (by incrementing the stages is meant, for example, if two steam pipes are already turned on a third steam pipe is turned on). If rapid cooling is not taking place, a timer is set for a fixed time period after which a comparison of the most recent temperature reading with a prior temperature reading is made to determine whether the heating stages already turned on are bringing the temperature back to the set point. If not, output for increasing the stages heating the bed is implemented. The function of this routine is to avoid overshooting the set point and overmanipulating the devices that bring stages on and off.

The procedure for HEAT STAGE DOWN is entered if the zone heat is less than the zone heat set point. A procedure almost identical to that for HEAT STAGE UP is used. In other words, if a temperature is not rapidly rising, stages are not cut out until after a delay to give prior stage changes a chance to take effect.

Figure 12:
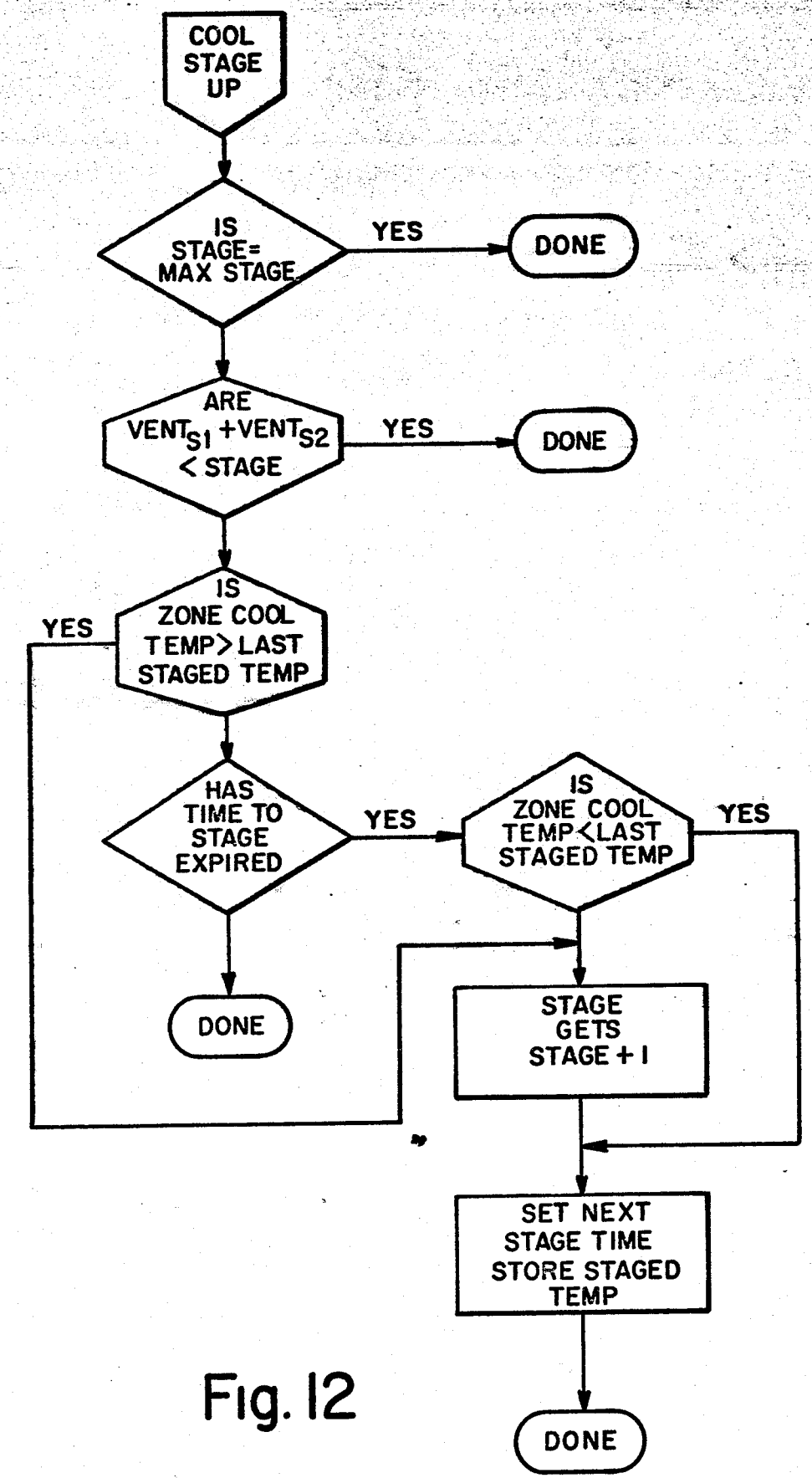
FIG. 12 is a flow diagram of a COOL STAGE UP procedure called by the main program.
Figure 13:
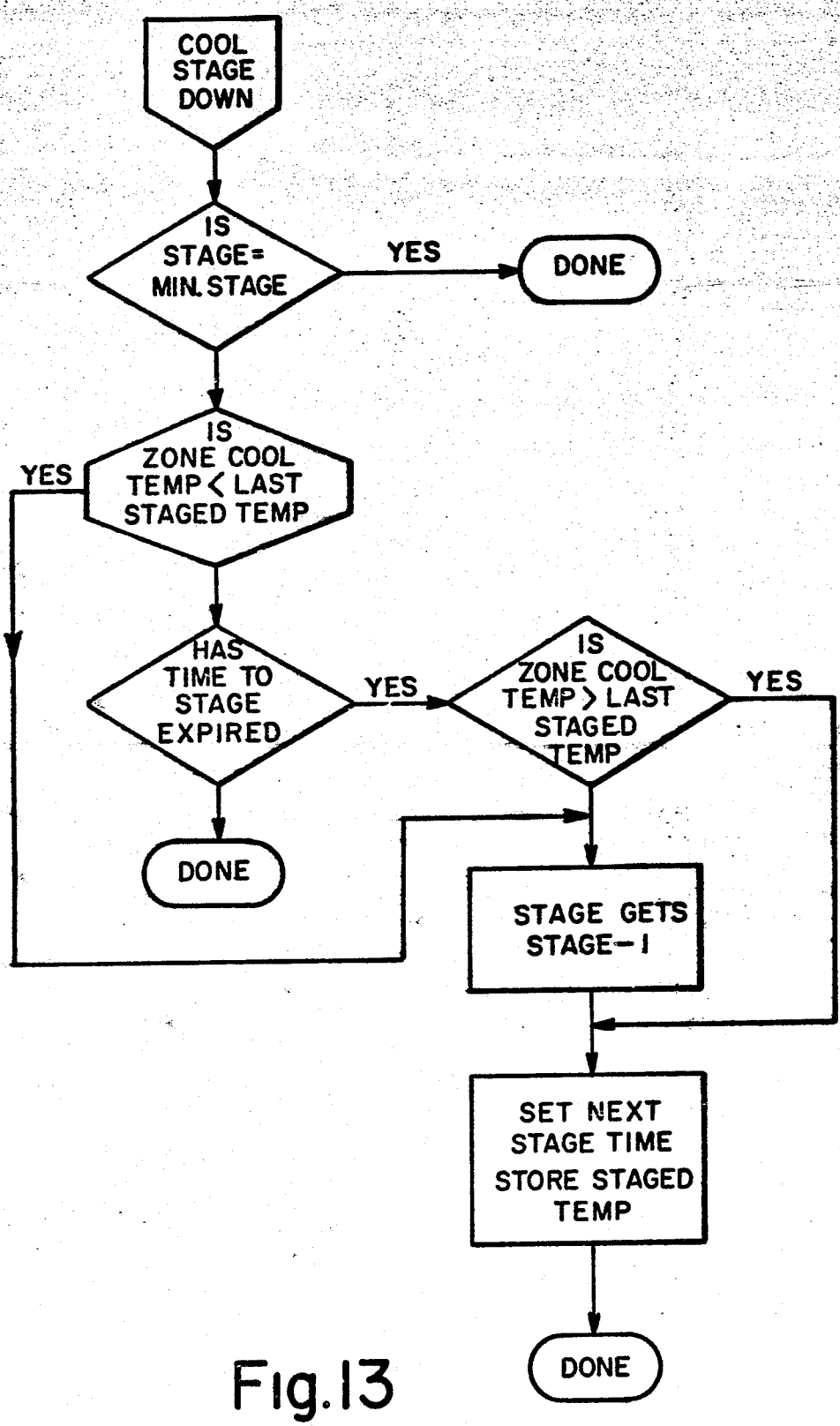
FIG. 13 is a flow diagram of a COOL STAGE DOWN procedure called by the main program.

Referring to FIGS. 12 and 13, the COOL STAGE UP procedure is entered if a cooling zone temperature is greater than the cooling set point. The COOL STAGE DOWN procedure is entered if the temperature is less than the cool set point. All zones are checked for processing by the heating and cooling procedures before the main line program moves the series of routines that are not necessarily zone specific.

Figure 14A:
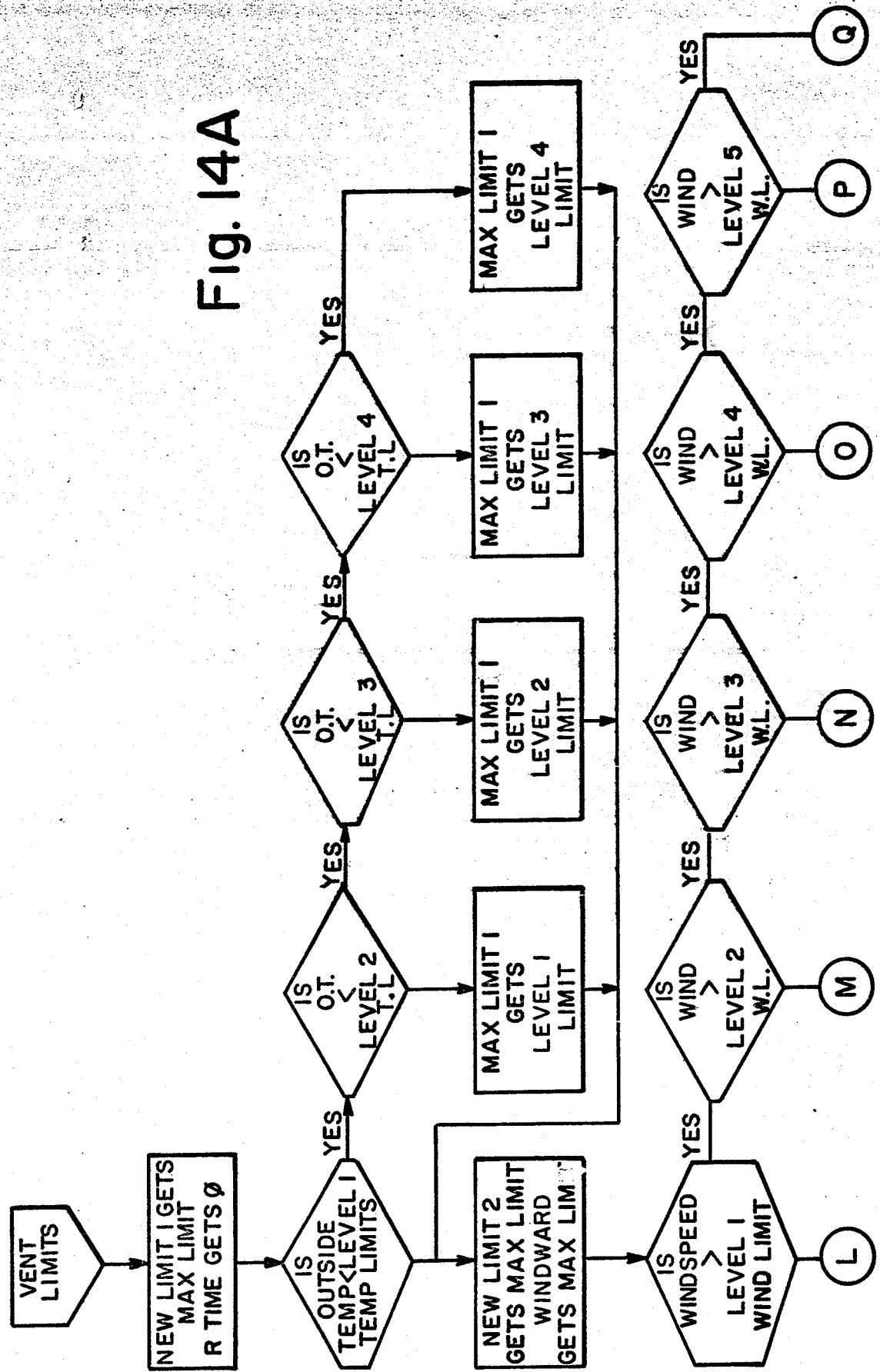
FIGS. 14A, 14B and 14C are flow diagrams of a VENT LIMITS procedure called by the main program.
Figure 14B:
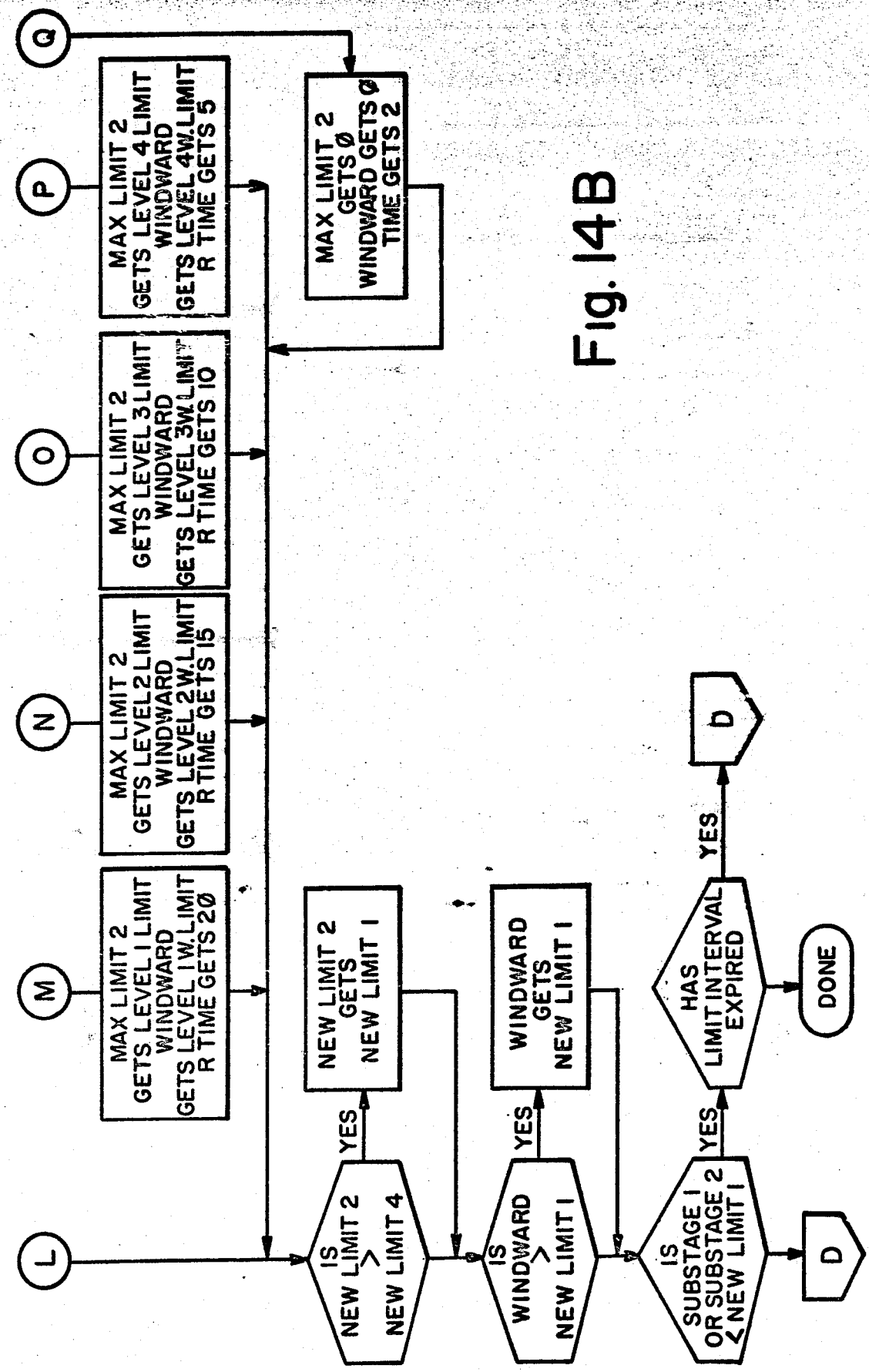
Figure 14C:
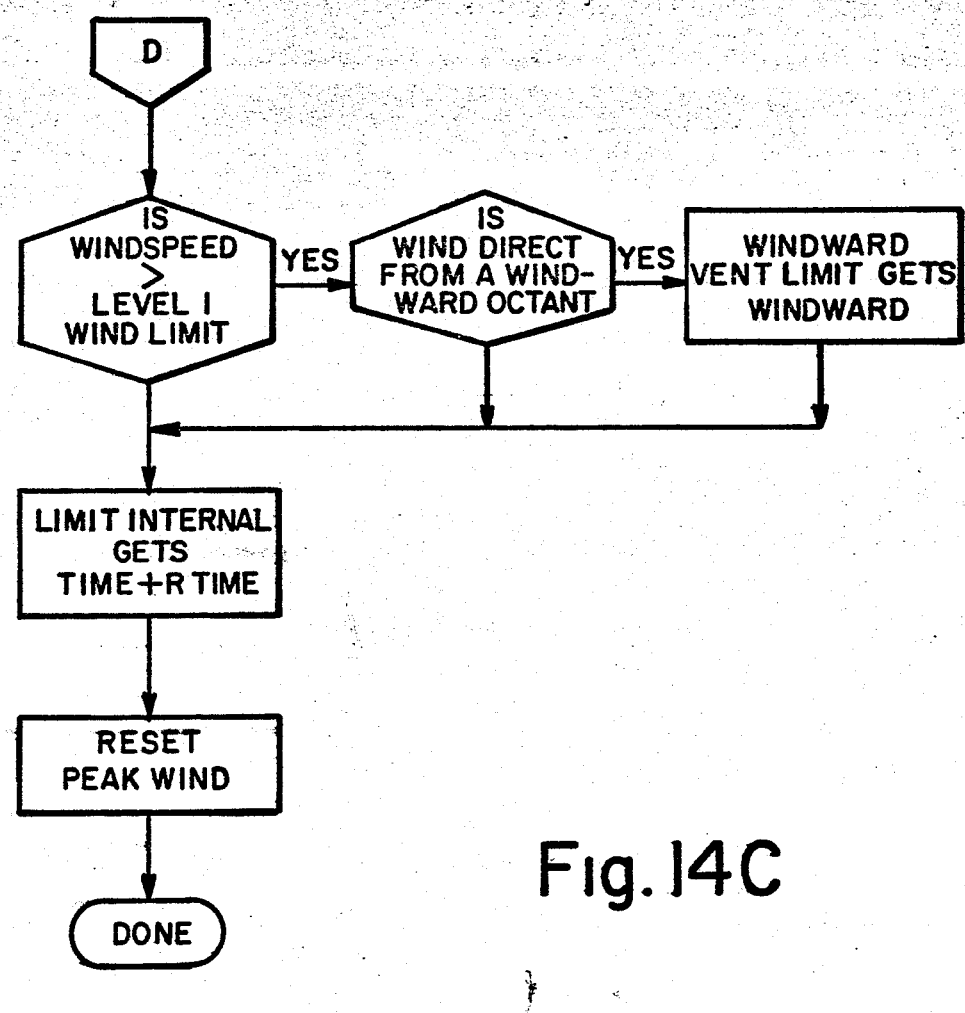

Referring to FIGS. 14A, 14B, and 14C, the VENT LIMITS procedure positions roof vents based upon external wind speed. Roof vents when opened are very susceptible to wind damage. The procedure sets restrictions within which the COOL STAGE UP and DOWN procedures can work. It sets maximum cooling stage (vent openings) for given wind conditions.

Figure 15:
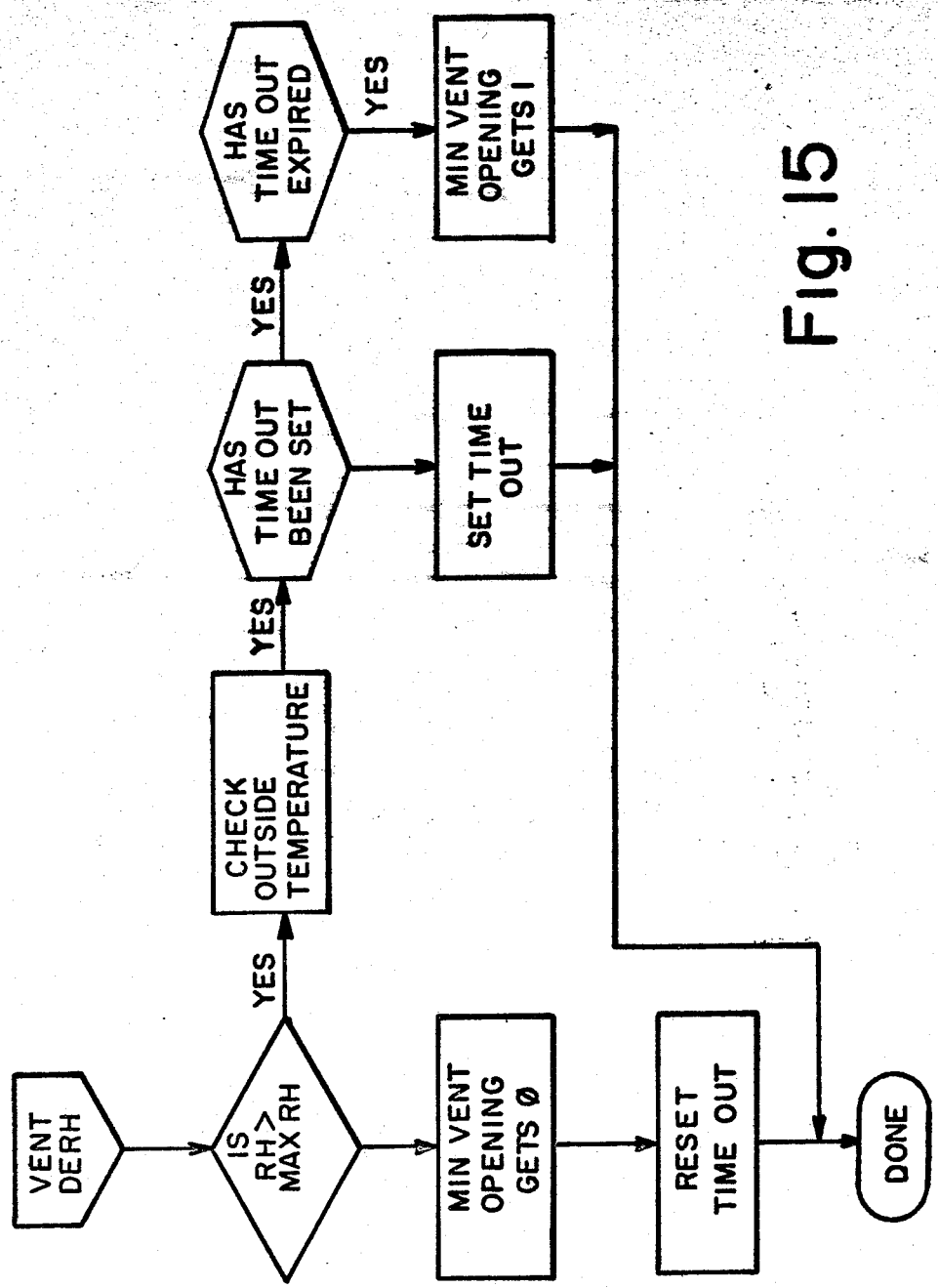
FIG. 15 is a flow diagram of a VENT DeRH (decondensate by venting) procedure called by the main program.

Referring to FIG. 15, the VENT DeRH (decondensate relative humidity) procedure is a disease control routine that is crop specific. The overall objective is to avoid free water or cycling through the dew point. The procedure is entered if the relative humidity is greater than the set point relative humidity and the outside temperature does not preclude opening the vents. A routine delay before venting action is taken to allow for stabilization and self-correction. If after the the delay, the sensed relative humidity is greater than the set point relative humidity, vents are opened.

Figure 16:
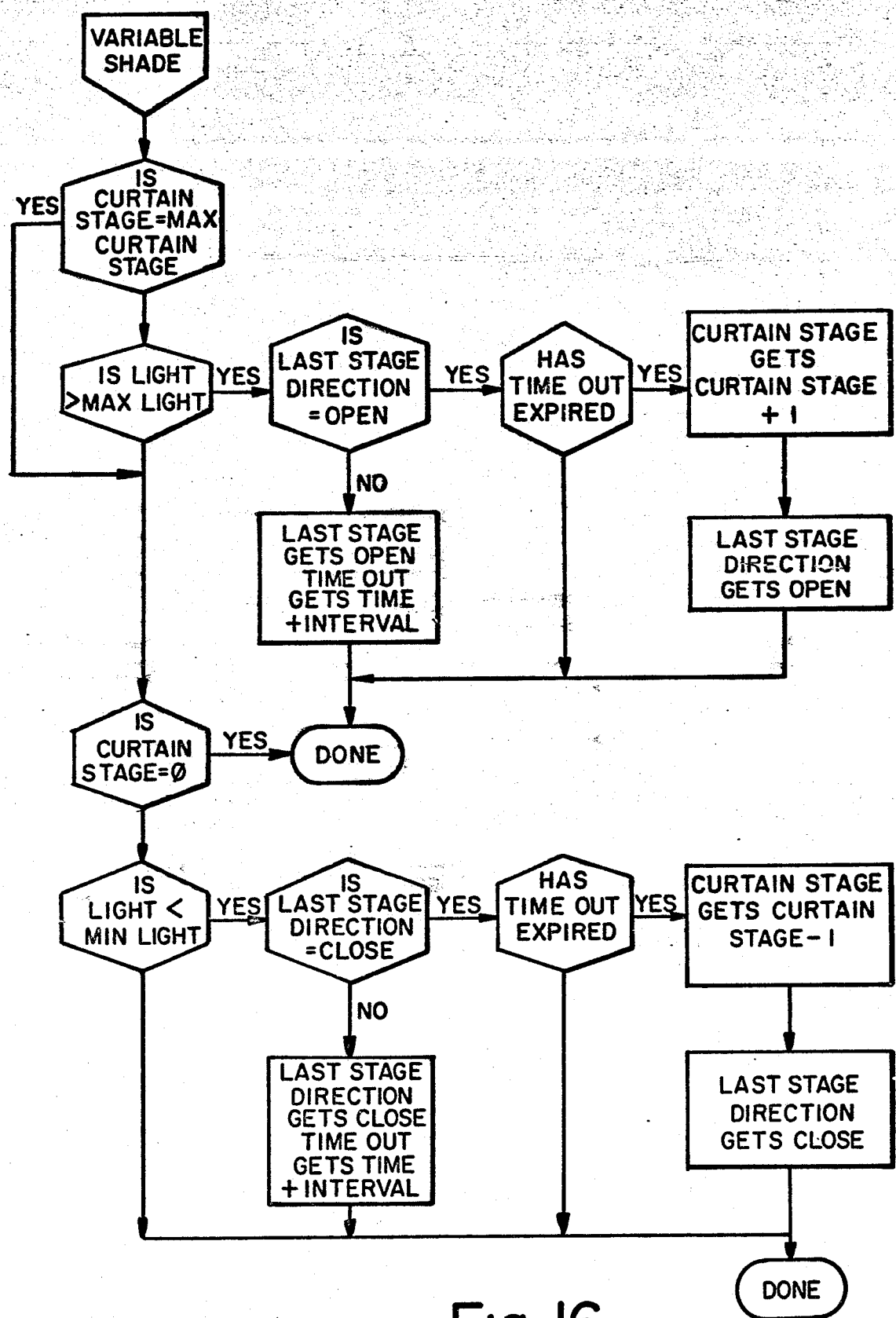
FIG. 16 is a flow diagram of a VARIABLE SHADE procedure called by the main program.

Referring to FIG. 16, the VARIABLE SHADE routine tests for available light greater than the maximum light set point. If so, a check is made to determine if the last movement of the shade or curtain was in the opening (uncovering) direction. If so and if after a delay the condition persists, the curtain stage is incremented. On the other hand, if the available light is less than the minimum light set point, a check is made to determine if last movement of the stage was to close the curtain (cover the crop). If so and if after a delay the condition persists, the curtain stage is decremented.

Figure 17:
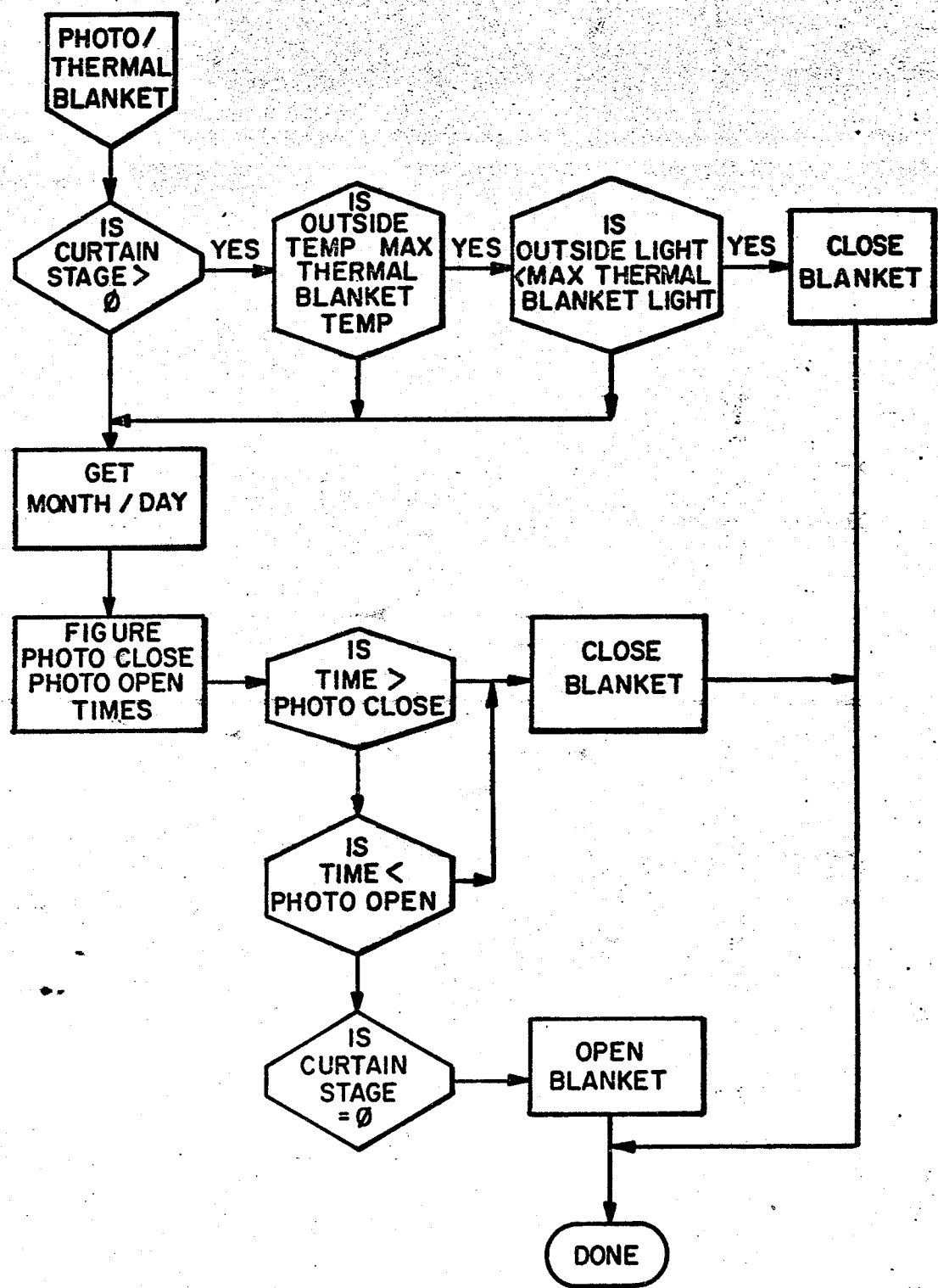
FIG. 17 is a flow diagram of a PHOTOTHERMAL BLANKET procedure.

The PHOTOTHERMAL BLANKET procedure illustrated in FIG. 17 tests to determine if the outside temperature is less than the maximum thermal blanket temperature and if the outside light is less than the maximum thermal blanket light. If so, the curtain is closed. If the curtain is already closed, the procedure obtains the month and day and determines the opening times for the curtain (after sunrise). The curtain must be opened in stages to allow slow intermixing of cooling air over the blanket with warmer air below the blanket or else await sufficient sunlight heating over the air above the blanket.

Figure 18:
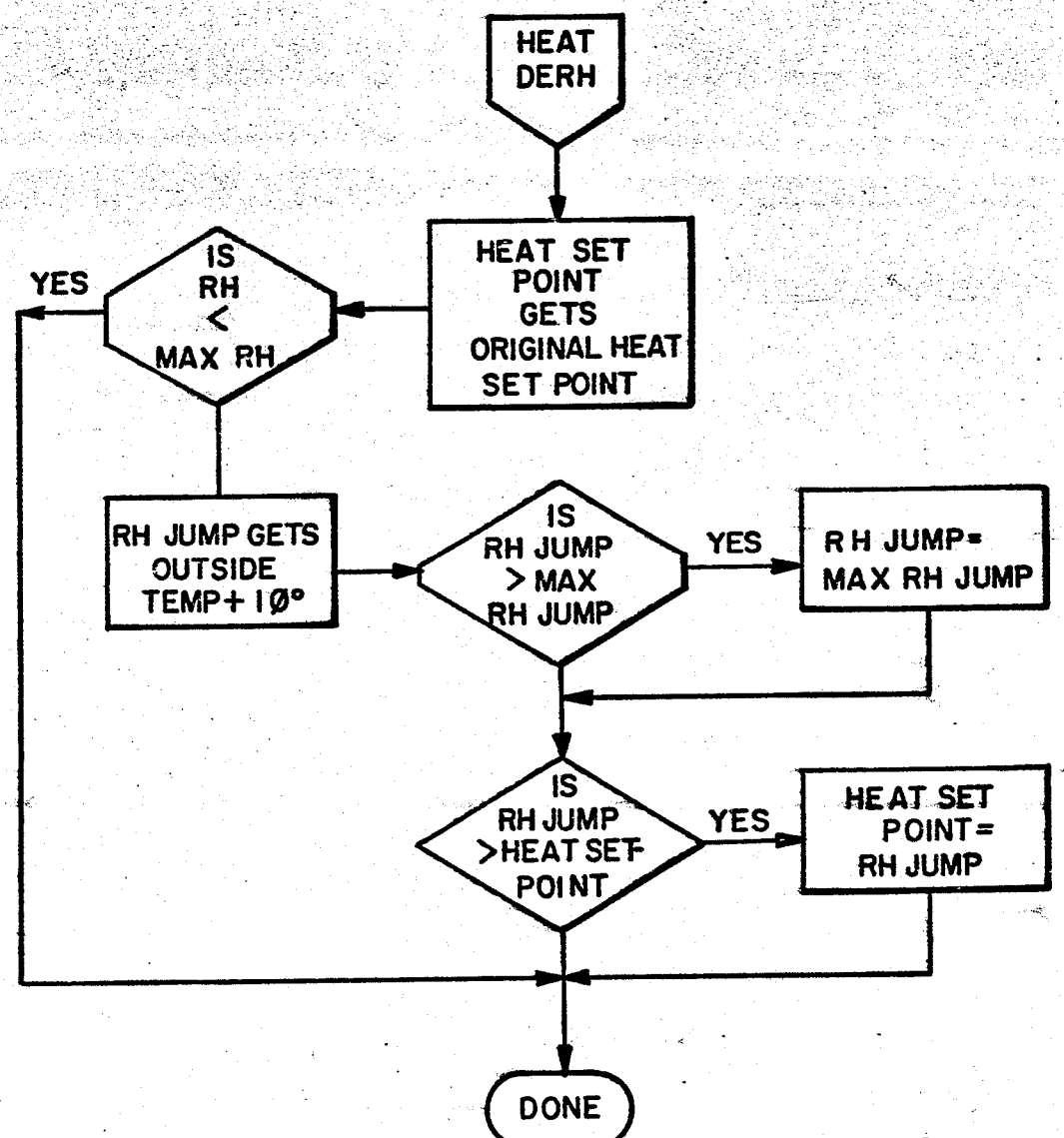
FIG. 18 is a flow diagram of a HEAT DeRH (decondensate by heating) procedure.

The HEAT DeRH (heat decondensate relative humidity) procedure is illustrated in FIG. 18. The procedure is completely executed if the heat set point and original set points are equal and the measured relative humidity greater than the maximum relative humidity. If the heat set point is not already ten degrees above the outside temperature, the heat set point will be set to be ten degrees above the outside temperature causing rapid decondensation on the windows of the greenhouse resulting in drying of the atmosphere in the greenhouse.

The DEVICE/MODULATING DEVICE ACTUATOR is a procedure that adds stages and deletes stages from devices that are supposed to be a stage maximum or stage minimum to assure, for example, that valves are fully opened or fully closed. Hence no feedback is required from these control devices to the computing system. The adding of stages, for example, to fully closed devices is not detrimental to the devices since they have their own limit switches.

Figure 19:
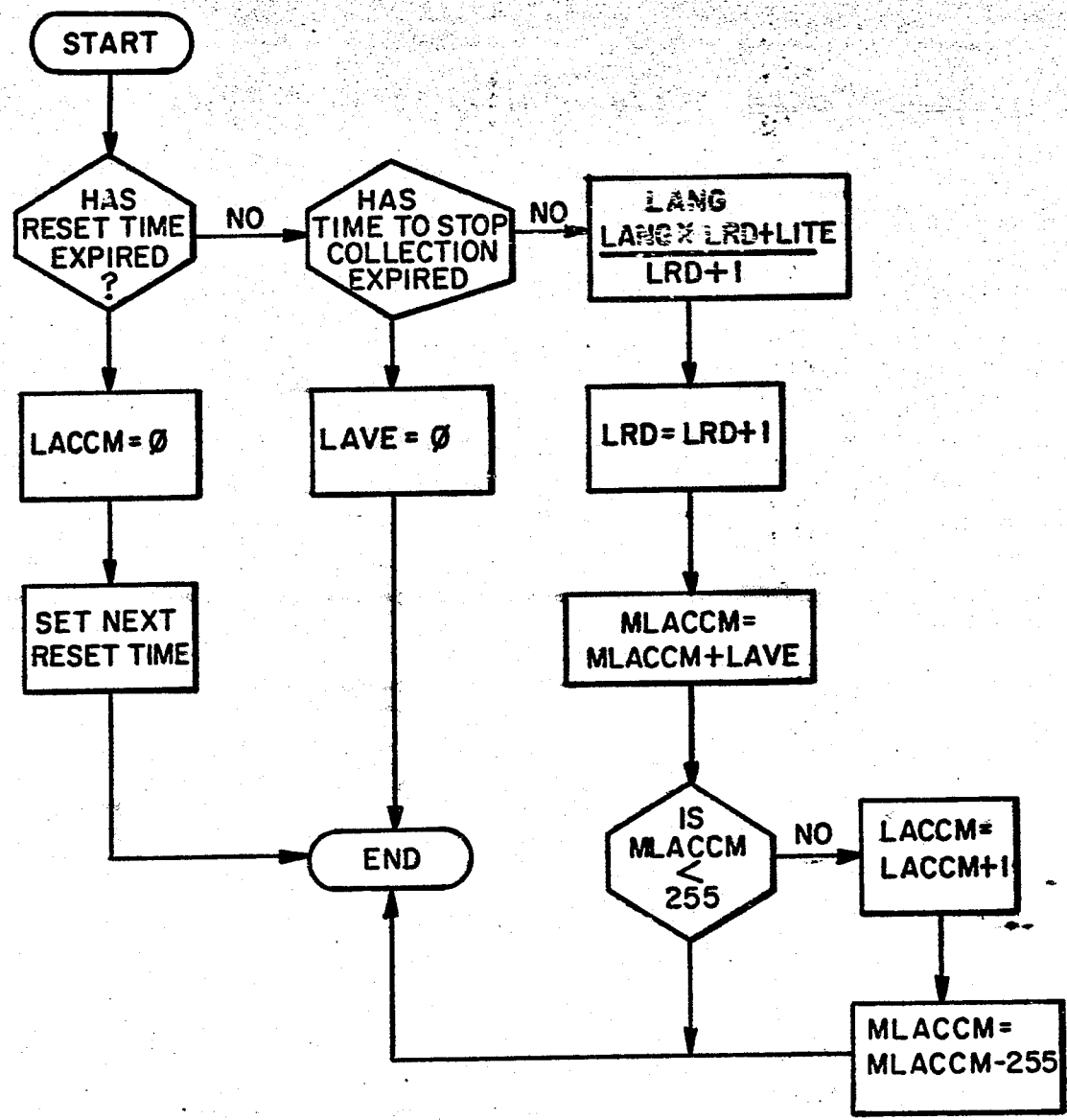
FIG. 19 is a flow diagram of a LIGHT ACCUMULATOR procedure.

The LIGHT ACCUMULATOR procedure integrates light intensity over time. Referring to FIG. 19, a particular LIGHT ACCUMULATOR procedure is described. The procedure first checks to determine if a new accumulator period should be started and if so, the variable $L_{accm}$ is set to zero. If not, the procedure checks to determine if a collection interval has passed. If so, the variable $L_{avg}$ is set to zero. Otherwise, the variable $L_{avg}$ is reassigned by adding the existing light level (lite) to the existing $L_{avg}$ multiplied by a weight factor $L_{rd}$ (number of average reads). The total is scaled by $L_{rd}$ plus 1. The amount of light incident the zone is accumulated in the variables $L_{accm}$ (high order bit) and $ML_{accm}$ (low order bit) scaled so that the maximum value of $L_{accm}$ is no more than 255. The values of $L_{avg}$ and $L_{accm}$ are used in the HEAT SET POINT DRIVER procedure.

The SET POINT DRIVER is a procedure for changing set points to provide for controlled growth conditions. This is the procedure that accepts an algorithm, for example, which maintains the temperature and perhaps mist, irrigation or carbon dioxide atmosphere as a function of available light to provide a desired growth rate and/or to make efficient use of energy. It is also the procedure which accepts an algorithm which may control the growth rate to be the maximum possible. A procedure for setting command levels to obtain maximum growth rate might be as follows: first the available light is sensed. Next, the carbon dioxide level is adjusted upward toward a maximum which is based upon the available light. Finally the best temperature is calculated from the actual light and the carbon dioxide levels.

A HEAT SET POINT DRIVER that adjusts the heat set points in response to the $L_{avg}$ (average light) and the $L_{accm}$ (accumulated light) is described in FIGS. 20A, 20B, and 20C. The output of the calculation in the portions of the procedure shown in FIGS. 20A and 20B is a rate that the existing set point is to changed. Once that rate is established, an interval is also established after which the existing set point is incremented or decremented by one degree at a time (see entry point C on FIG. 20C). Thus, the calculation based upon $L_{avg}$ and $L_{accm}$ made, for example every thirty minutes, and in the following thirty minutes the set point is increased or decreased one degree at a time at spaced intervals (ten minute intervals if the rate of change is six degrees per minute).

In this procedure, temperature set point $T_{sp}$ is set between a minimum temperature $T_{mn}$ (say 58° F.) and a maximum temperature $T_{mx}$ (say 68° F.) preselected for the specific crop. If the average light $L_{avg}$ is below a minimum light $L_{mn}$ (say zero foot candles) required for significant growth, the minimum temperature is selected. If the light is above $L_{mx}$ (say 4000 foot candles) i.e. the light intensity at which growth is to be pushed, the temperature is set for $T_{mx}$. Between light intensities of $L_{mx}$ and $L_{mn}$ the temperature is adjusted proportionally between $T_{mx}$ and $T_{mn}$.

The value $T_{sp}$ is calculated by yet another algorithm based upon $L_{accm}$. If that value (R) is less than the value of $T_{sp}$ already calculated the value of R is adopted as $T_{sp}$.

The difference B between $T_{sp}$ and the established set point is determined and the maximum difference is constrained by maximum increase $R_{mx}$ and minimum decrease $F_{mx}$ differences. The differences are then converted to a minutes per degree (MPD) change in the set point over the following interval of $S_{int}$ minutes.

The PIPE TEMPERATURE anticipator procedure is a procedure that predicts the pipe temperatures required to maintain a given temperature at the zone based upon outside temperatures. The procedure of FIGS. 22A, 22B, and 22C establishes a value for R which is a correction factor used in the main PIPE TEMPERATURE ANTICIPATOR procedure shown in FIG. 21. The correction factor is based upon a comparison of the last zone temperature and the set point temperature.

The main PIPE TEMPERATURE ANTICIPATOR procedure is based upon the difference between outside temperature and the set point temperature and the capability of the heating system to respond to that difference. The maximum differential temperature that the heating system can overcome depends, of course, on the particular greenhouse and the particular heating system. The pipe temperature $P_{mx}$ is the maximum pipe temperature at maximum heat output. The pipe temperature $P_{mn}$ when no output is being required of the heating system may be taken as the ambient temperature. The target temperature $P_{tar}$ for the pipes is assigned between $P_{mx}$ and $P_{mn}$ taking into consideration the solar heating. (See the factor lite times $R_{ad}$. $R_{ad}$ is a factor for each zone that scales the raw light energy sensor readings.)

Having thus described the invention in the detail and with the particularity required by the Patent Laws, what is desired protected by Letters Patent is set forth in the following claims.

We claim:

1. A system for controlling environmental conditions in greenhouses having a plurality of crop beds within one greenhouse enclosure arranged into a plurality of sense zones and a plurality of control zones comprising:
   a. a plurality of sensors stationed over crop beds within each sense zone comprising an aspirated enclosure and means therein for generating analog electrical signals indicative of wet bulb and dry bulb temperatures and also means for generating an analog electrical signal indicative of incident light over the bed;
   b. a microcomputer located within the greenhouse comprising:
      i. a central processing unit with associated scratch memory and program memory sections;
      ii. an analog to digital input section for receiving the analog electrical signals from the sensors;
      iii. an output section for converting computer logic signals to electrical signals at power levels to operate electromechanical apparatus; and
      iv. serial digital pathway means for connecting the central processing unit, input section and output section;
   c. said program memory programmed with:
      i. a task for inputting digital data from the input section indicative of wet bulb and dry bulb temperatures and for calculating the moisture content of the atmosphere over each bed and for inputting digital data from the input section indicative of light intensity;
      ii. a task for selecting temperature and moisture command levels based upon the intensity of incident light and comparing the input temperature and moisture content with said selected command levels for each sense zone; and
      iii. a task which in response to said comparison generates commands to the output section capable of initiating therethrough electromechanical action associated with each control zone to move the temperature and moisture content for each sense zone toward the selected command levels.

2. A system for controlling environmental conditions in greenhouses having a plurality of crop beds within one greenhouse enclosure arranged into a plurality of sense zones and a plurality of control zones comprising:
   a. a plurality of sensors stationed over crop beds within each sense zone comprising an aspirated enclosure and means therein for generating analog electrical signals indicative of wet bulb and dry bulb temperatures and also means for generating an analog electrical signal indicative of incident light over the beds;
   b. a microcomputer located within the greenhouse comprising:
      i. a central processing unit with associated scratch memory and program memory sections;
      ii. an analog to digital input section for receiving the analog electrical signals from the sensors;
      iii. an output section for converting the computer logic signals to electrical signals at power levels to operate electromechanical apparatus; and
      iv. serial digital pathway means for connecting the central processing unit, input section and output section;
   c. said program memory programmed with:
      i. a task for inputting digital data for the input section indicative of wet bulb and dry bulb temperatures and for calculating the moisture content of the atmosphere over each bed and for inputting digital data from the input section indicative of light intensity;
ii. a task for comparing the intensity of the incident light with a preselected command level and for selecting temperature and moisture command levels based upon the intensity of incident light and comparing the input temperature and moisture data with said selected command levels for each sense zone; and
iii. a task which in response to the comparison of the intensity of the incident light with the preselected command level generates commands to the output section capable of initiating therethrough electromechanical action to adjust intensity of the light over the bed toward the preselected command and which in response to the comparison of the input temperature and moisture content with the said selected command levels generates commands to the output section capable of initiating therethrough electromechanical action associated with each control zone to move the temperature and moisture content for each sense zone toward the selected command levels.

3. A system for controlling environmental conditions in greenhouses having a plurality of crop beds within one greenhouse enclosure arranged into a plurality of sense zones and a plurality of control zones comprising:
   a. a plurality of sensors stationed over crop beds within each sense zone comprising an aspirated enclosure and means therein for generating analog electrical signals indicative of wet bulb and dry bulb temperatures and also means for generating an analog electrical signal indicative of incident light over the bed;
   b. a microcomputer located within the greenhouse comprising:
      i. a central processing unit with associated scratch memory program memory sections and a real time clock;
      ii. an analog to digital input section for receiving the analog electrical signals from the sensors;
      iii. an output section for converting the computer logic signals to electrical signals at power levels to operate electromechanical apparatus; and
      iv. serial digital pathway means for connecting the central processing unit, input section and output section;
   c. said program memory programmed with:
      i. a task for reading the real time clock and setting and updating the duration of time a crop has been growing;
      ii. a task for inputting digital data from the input section indicative of wet bulb and dry bulb temperatures and for calculating the moisture content of the atmosphere over each bed and for inputting digital data from the input section indicative of light intensity;
      iii. a task for selecting temperature and moisture levels based upon the intensity of the incident light and the time the crop has been growing and comparing the input temperature and moisture data with said selected levels for each sense zone; and
      iv. a task which in response to said comparison generates commands to the output section capable of initiating therethrough electromechanical action associated with each control zone to move the temperature and moisture content for each sense zone toward the selected levels.

4. A system for controlling environmental conditions in greenhouses having a plurality of crop beds within one greenhouse enclosure arranged into a plurality of sense zones and a plurality of control zones comprising:
   a. a plurality of sensors stationed over crop beds within each sense zone comprising an aspirated enclosure and means therein for generating analog electrical signals indicative of wet bulb and dry bulb temperatures and means for generating an analog electrical signal indicative of incident light over the beds and also means for generating an analog electrical signal indicative of available sunlight;
   b. a microcomputer located within the greenhouse comprising:
      i. a central processing unit with associated scratch memory and program memory sections;
      ii. an analog to digital input section for receiving the analog electrical signals from the sensors;
      iii. an output section for converting the computer logic signals to electrical signals at power levels to operate electromechanical apparatus; and
      iv. serial digital pathway means for connecting the central processing unit, input section and output section;
   c. said program memory programmed with:
      i. a task for inputting digital data for the input section indicative of wet bulb and dry bulb temperatures and for calculating the moisture content of the atmosphere over each bed and for inputting digital data from the input section indicative of light intensity over the bed and available sunlight;
      ii. a task for comparing the intensity of the incident light with a preselected command level and for selecting temperature and moisture command levels based upon the intensity of incident light over the bed and comparing the input temperature and moisture data with said selected commands levels for each sense zone;
      iii. a task which in response to the comparison of the intensity of the incident light with the preselected command level generates commands to the output section capable of initiating therethrough electromechanical action for each control zone to adjust intensity of the light over the bed toward the command level and which in response to the comparison of the input temperature and moisture content with the said selected command levels generates commands to the output section capable of initiating therethrough electromechanical action for each control zone to move the temperature and moisture content toward the selected command levels for each sense zone, and
      iv. a task which in response to the available sunlight generates commands to the output section capable of initiating therethrough electromechanical action for each control zone to position a shading device over the bed to reduce radiation heat losses under conditions where the bed must be heated to maintain the selected level.

5. The systems according to claim 1, 2, 3, or 4 wherein the tasks for selecting command levels do so to maximize crop growth.

6. The systems according to claim 1, 2, 3, or 4 wherein the tasks for selecting command levels do so to maximize crop growth and minimize heating power input other than sunlight.

7. The systems according to claims 1, 2, 3, or 4 further comprising at least one sensor external the greenhouse for generating an analog signal indicative of an external condition affecting heat loss from the greenhouse and said program memory programmed with a task which in response to external conditions generates a command to the output section capable of initiating electromechanical action in all control zones therethrough to move the temperature in all sense zones in anticipation of a change in heat loss.

* * * * *